June 6, 1967  F. P. CARUTHERS  3,324,364
APPARATUS FOR THE CONTROL OF MACHINE TOOLS OR THE LIKE
Filed Aug. 16, 1960  18 Sheets-Sheet 11

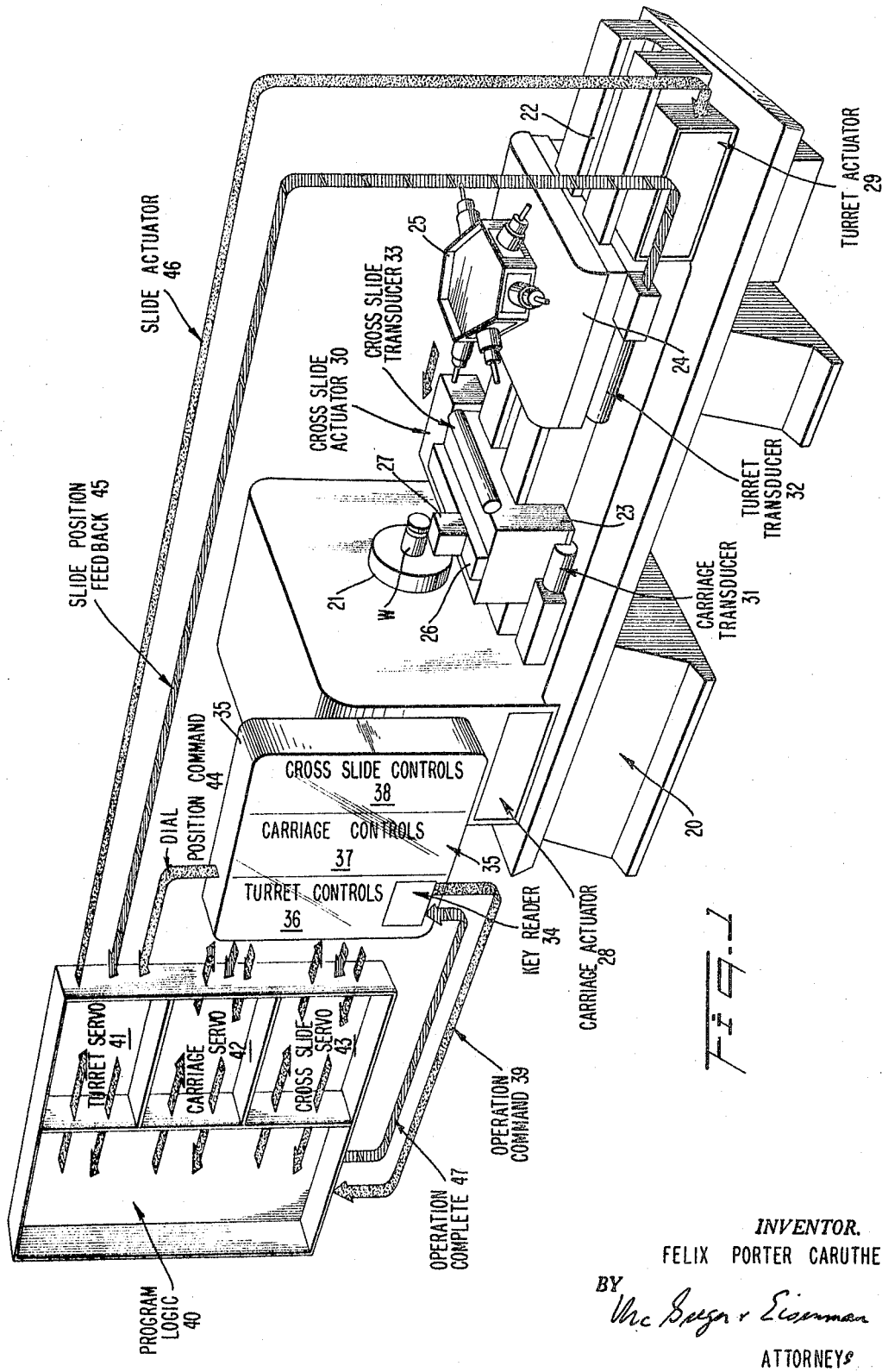

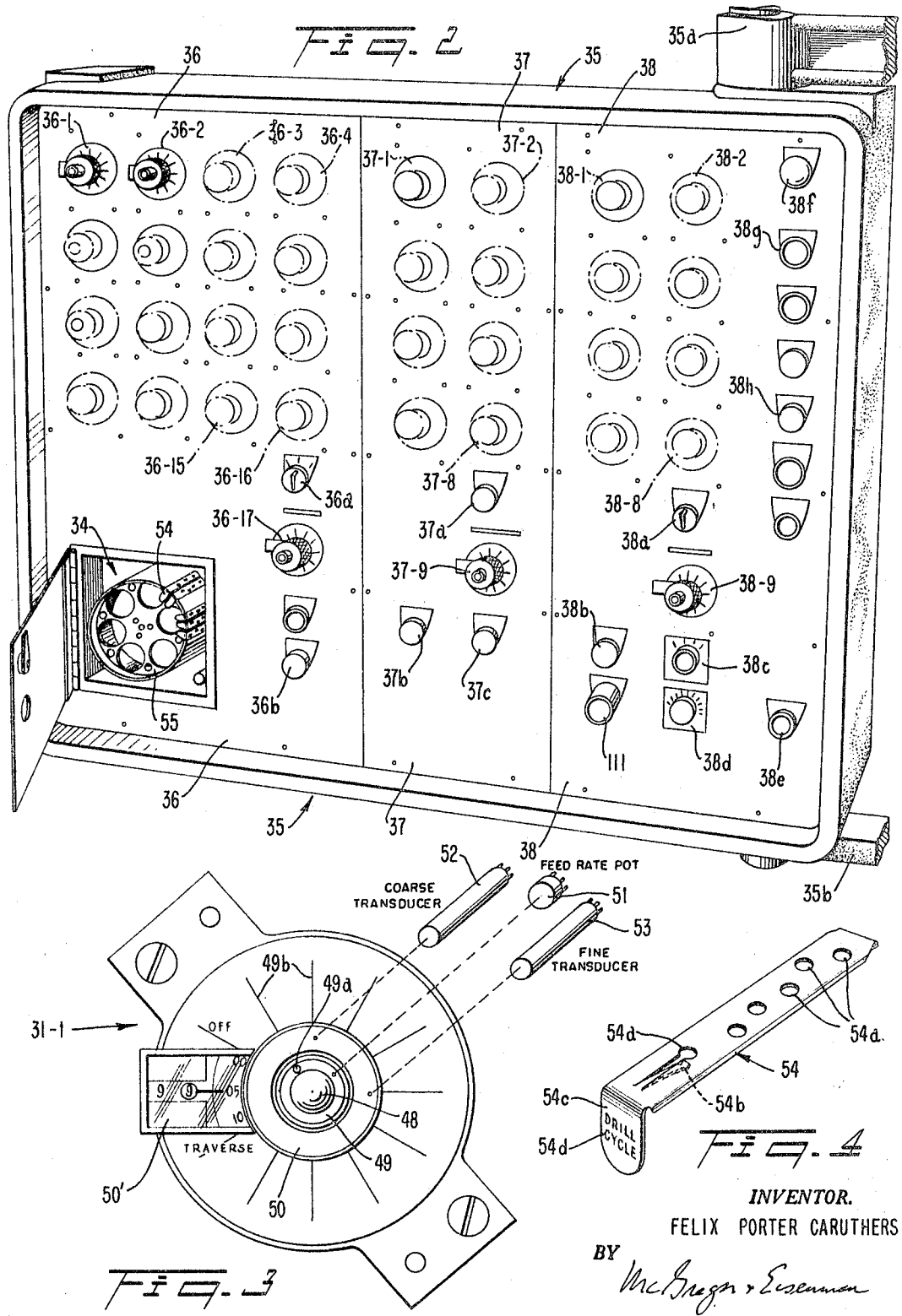

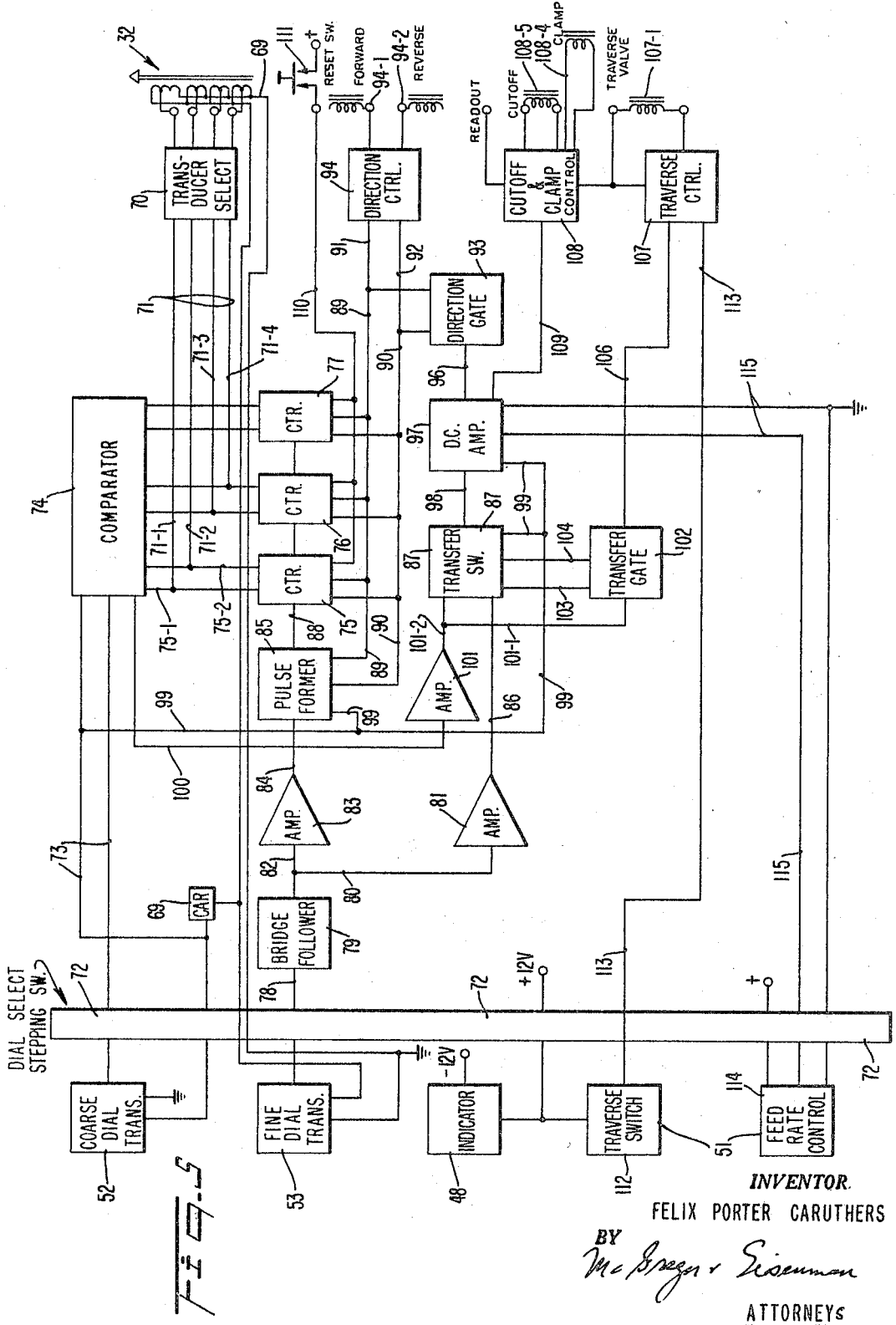

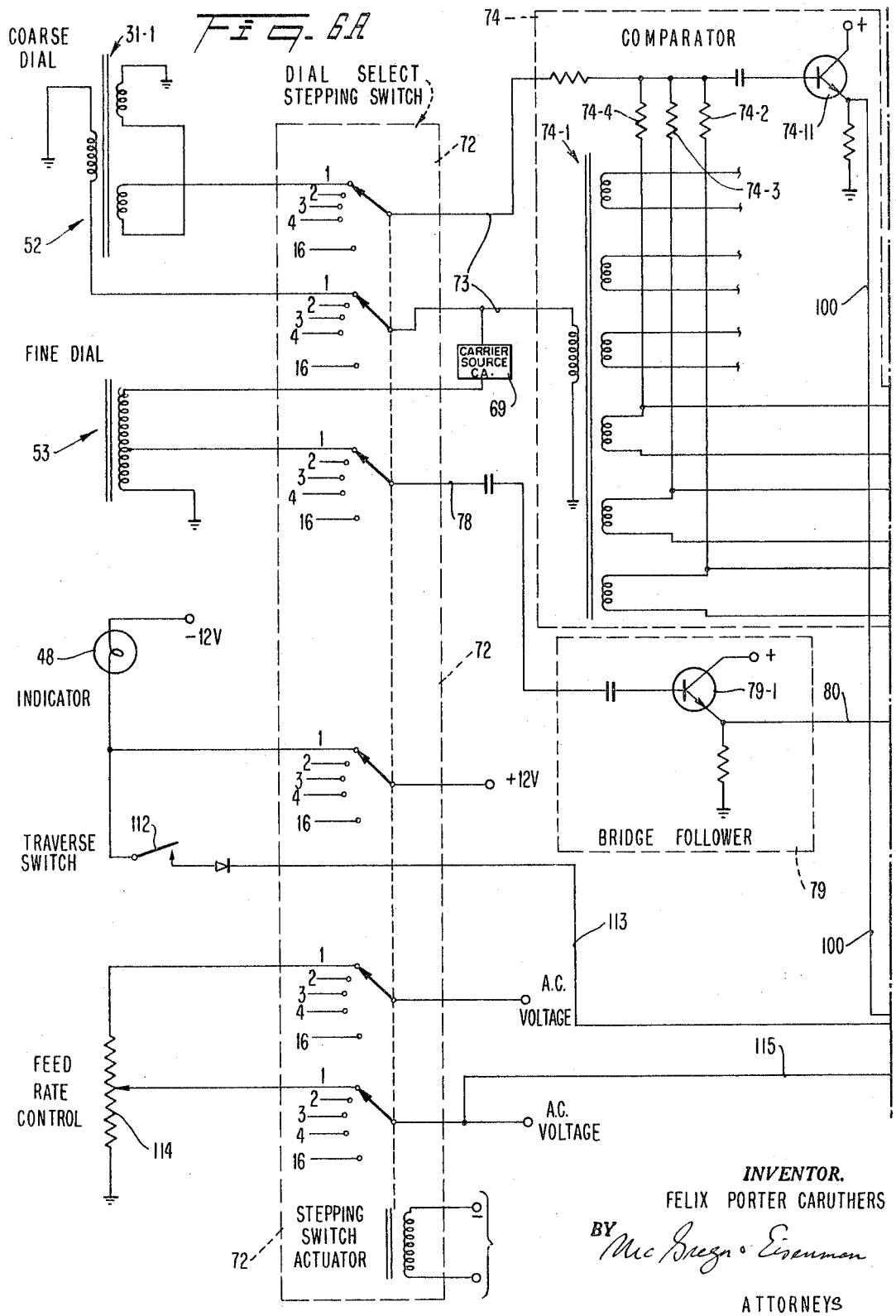

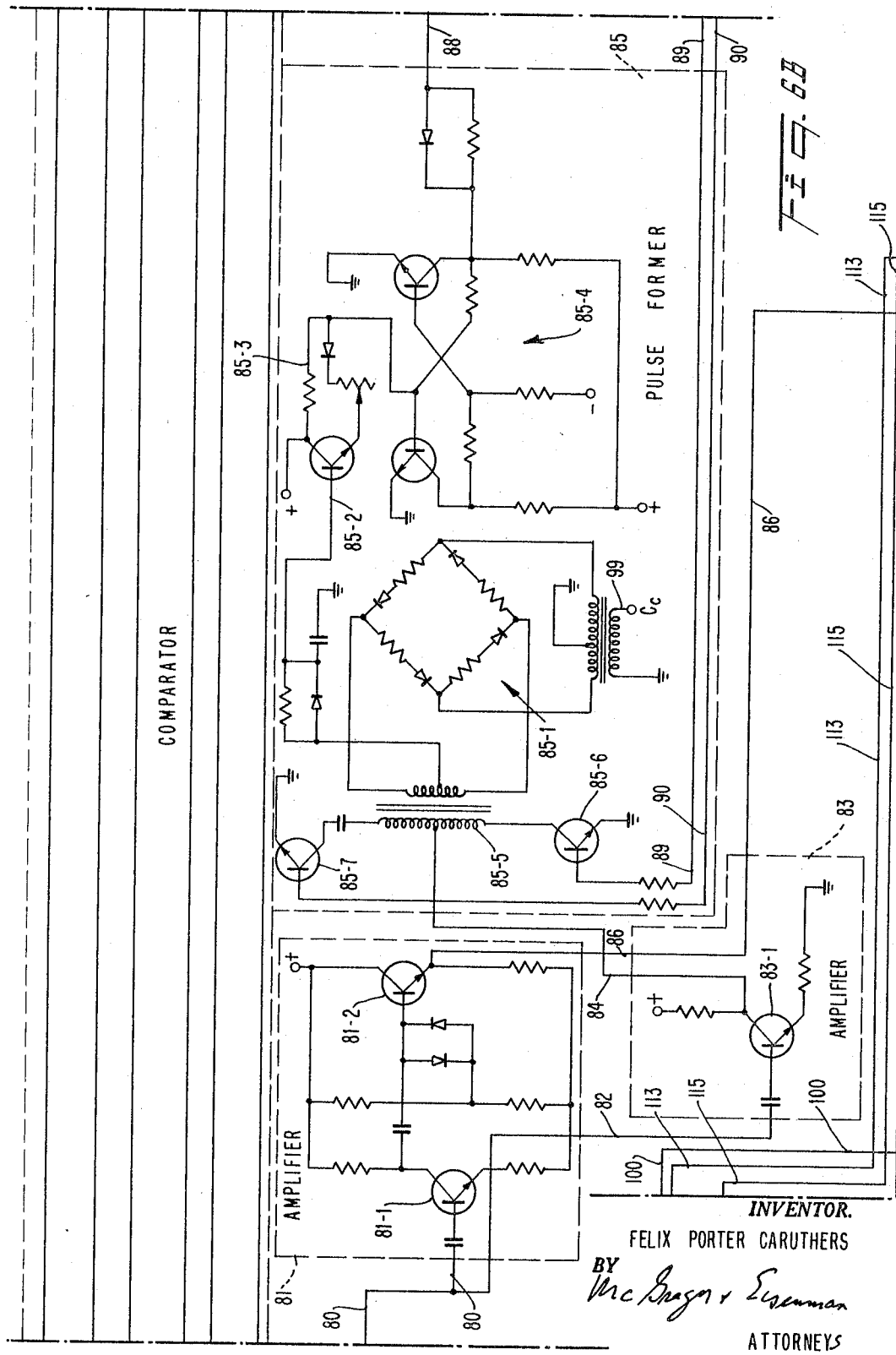

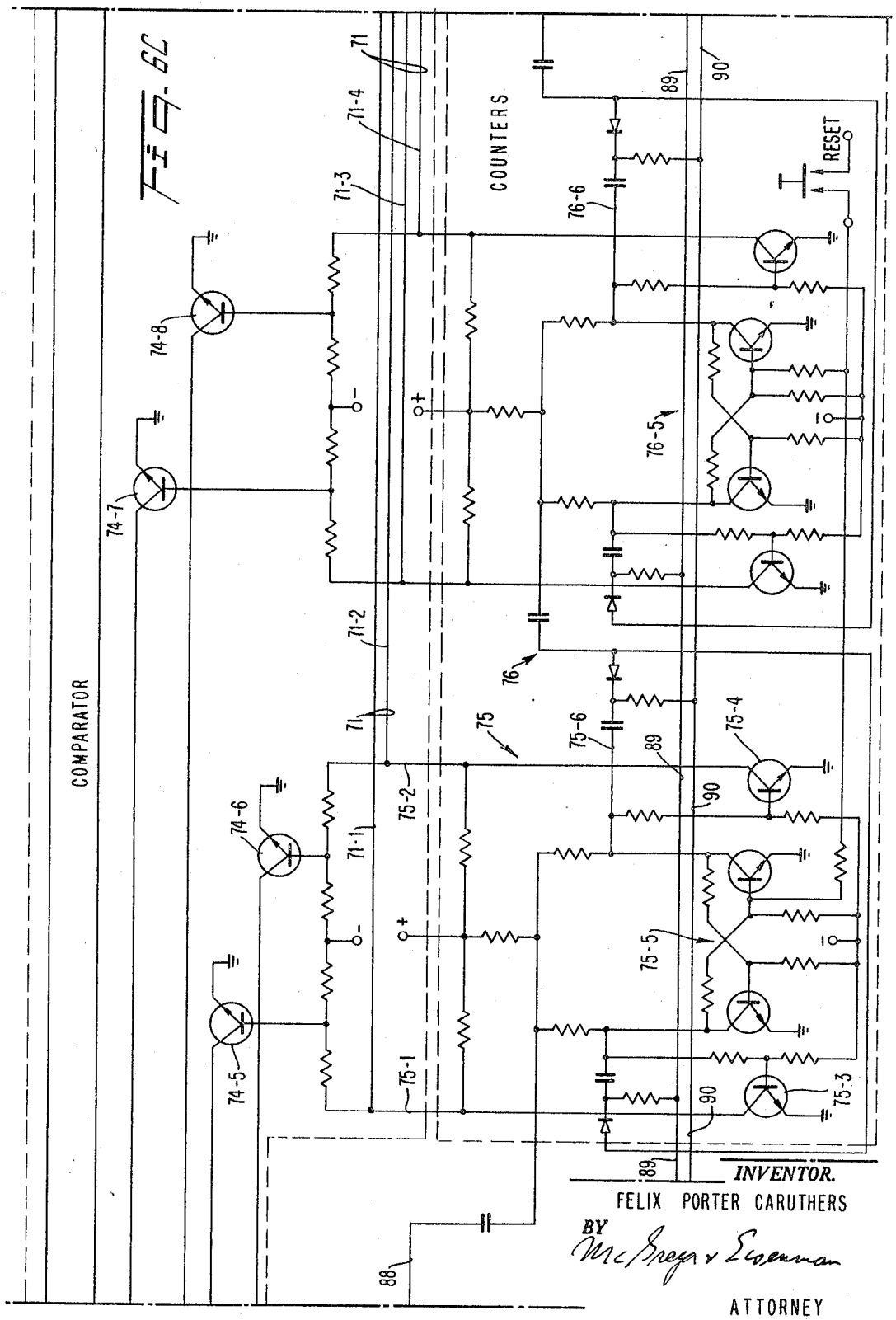

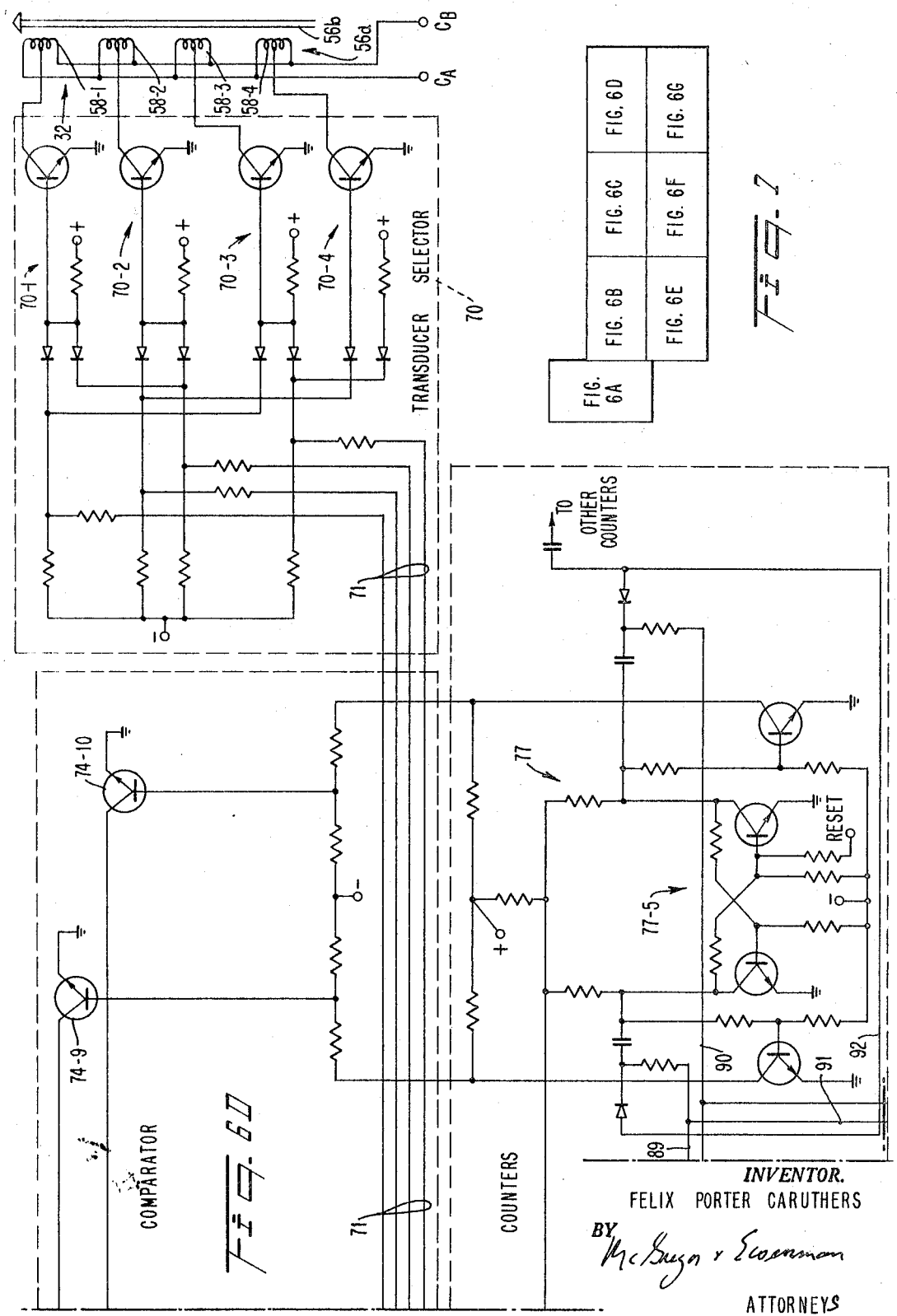

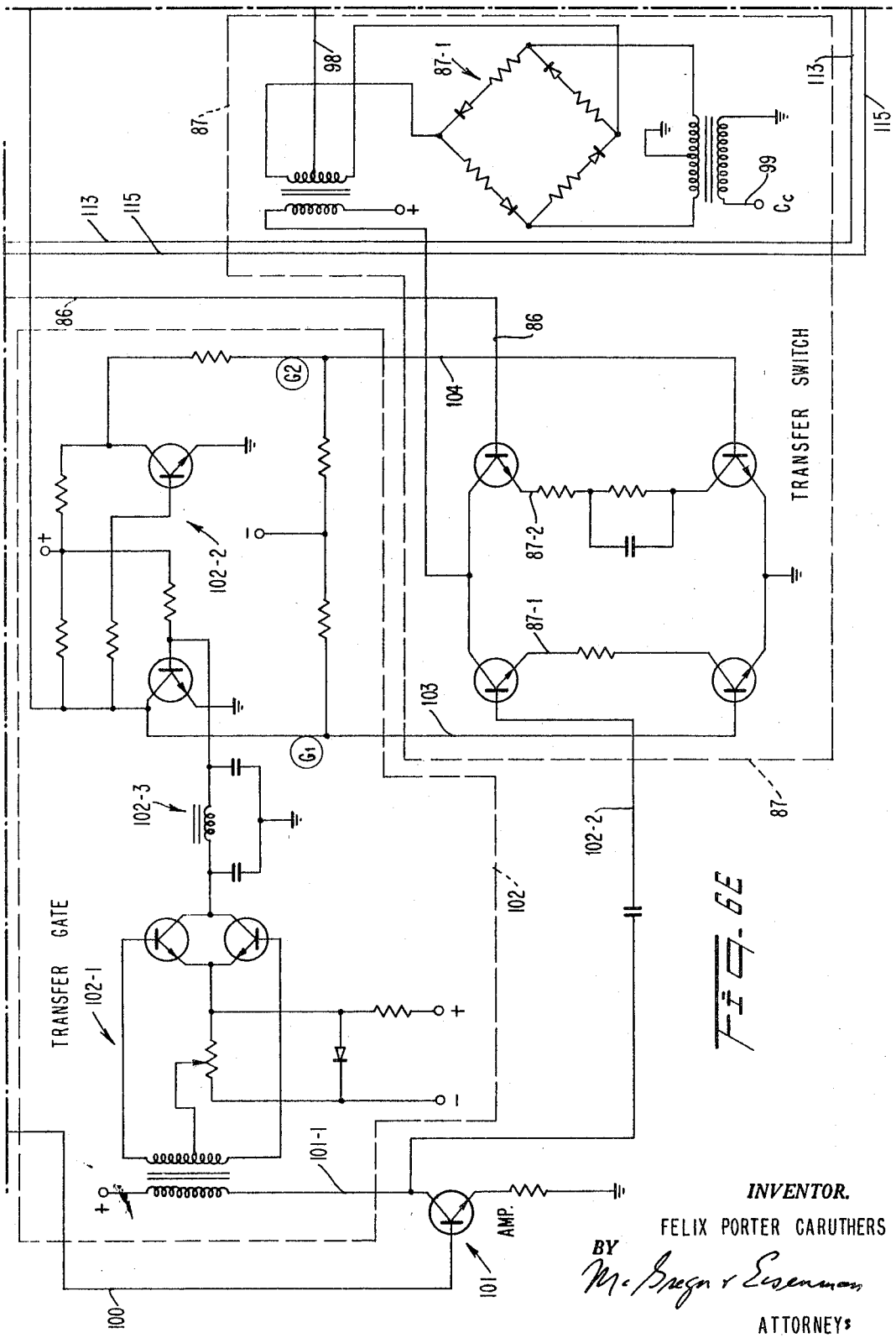

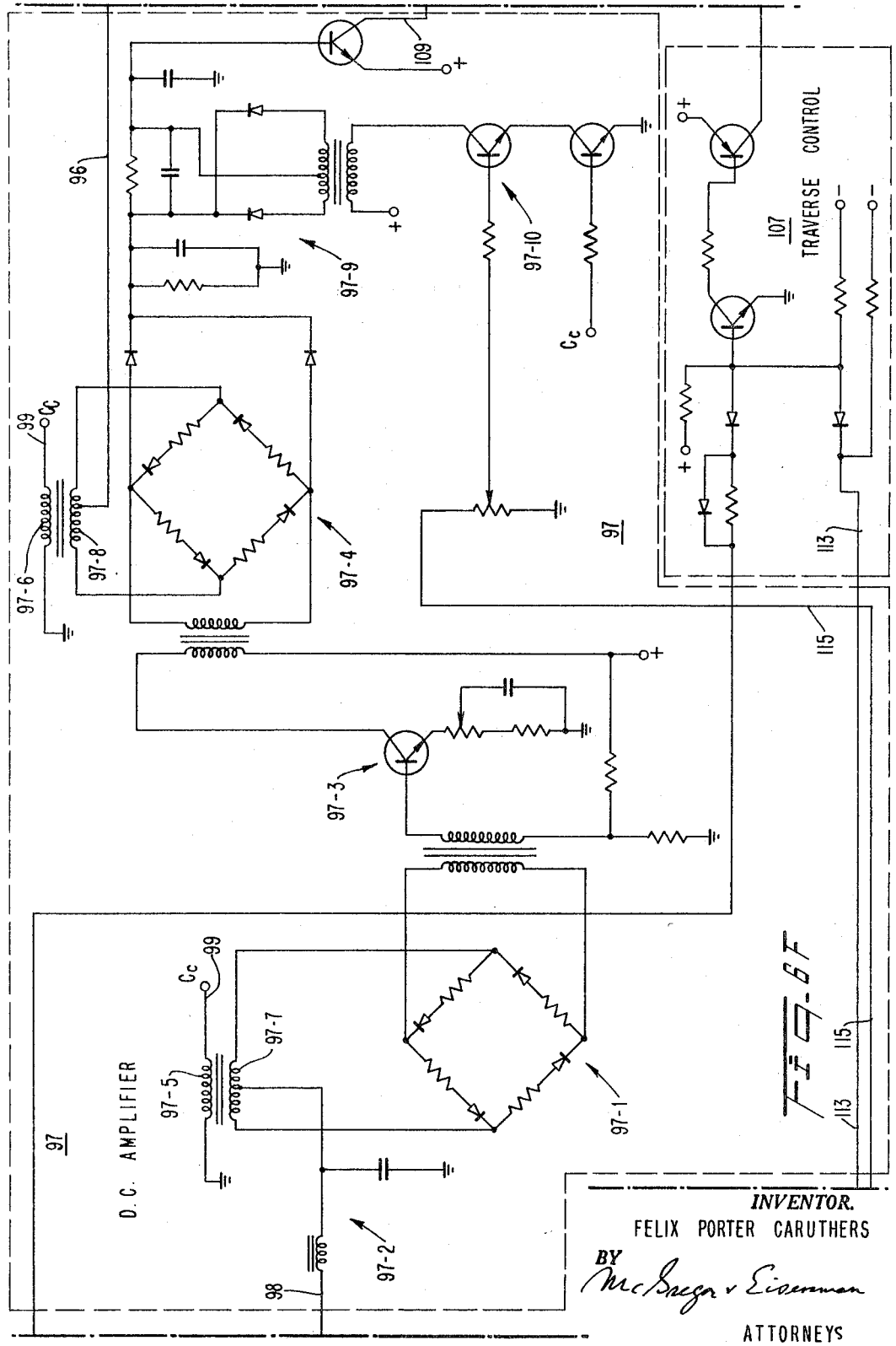

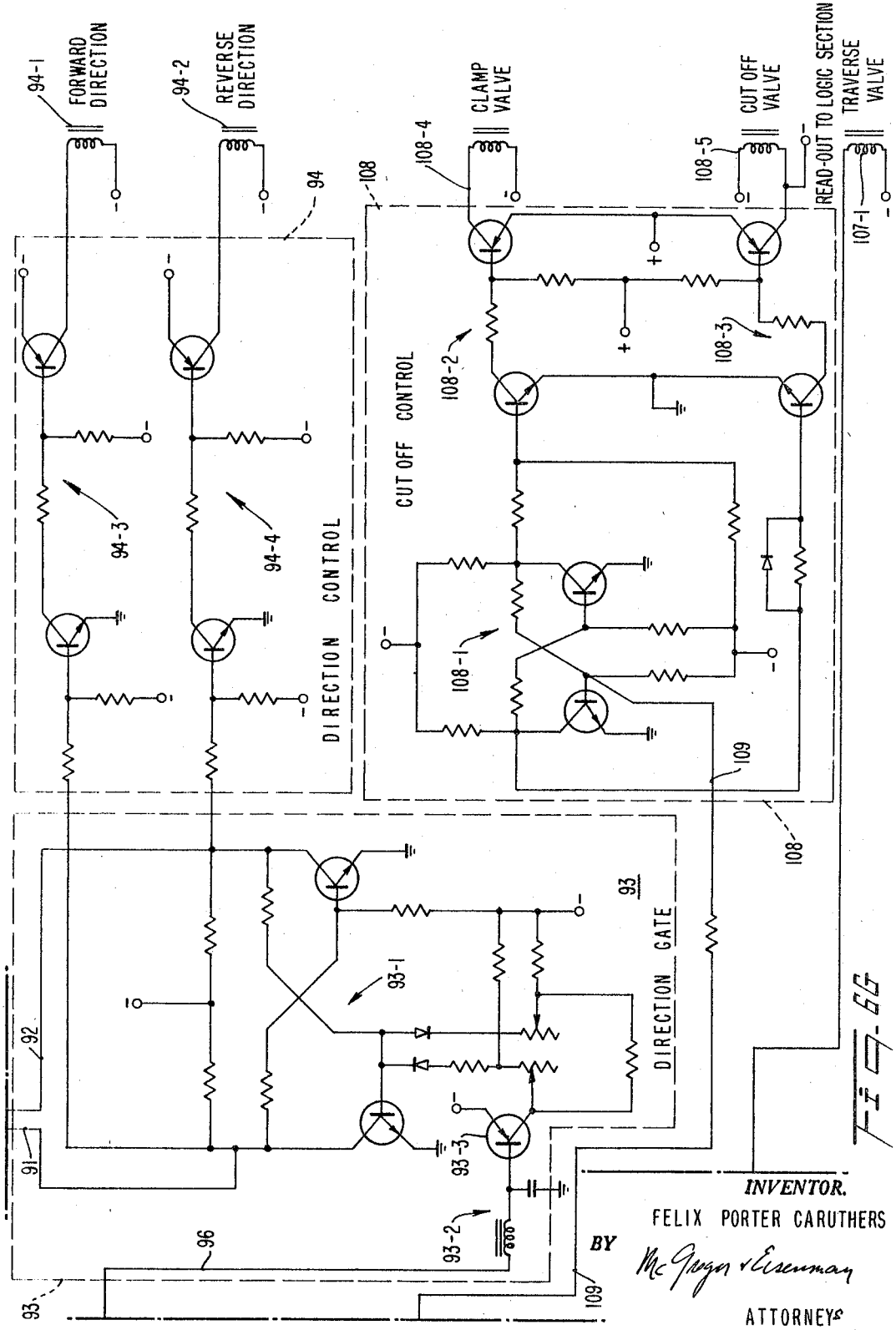

Fig. 8A  FINE  FORWARD  REVERSE

Fig. 8B  COARSE

Fig. 8C  TRANSFER GATE

Fig. 8F  PHASE SENSITIVE A.C.  COARSE  FINE  FINE  FINE  COARSE

Fig. 8G  PHASE RECTIFIED & FILTERED  COARSE  FORWARD  CROSS OVER OR SWITCH POINT  FINE  FALSE NULL  FEED ONLY  REVERSE  COARSE

Fig. 8H

INVENTOR.
FELIX PORTER CARUTHERS
BY
ATTORNEYS

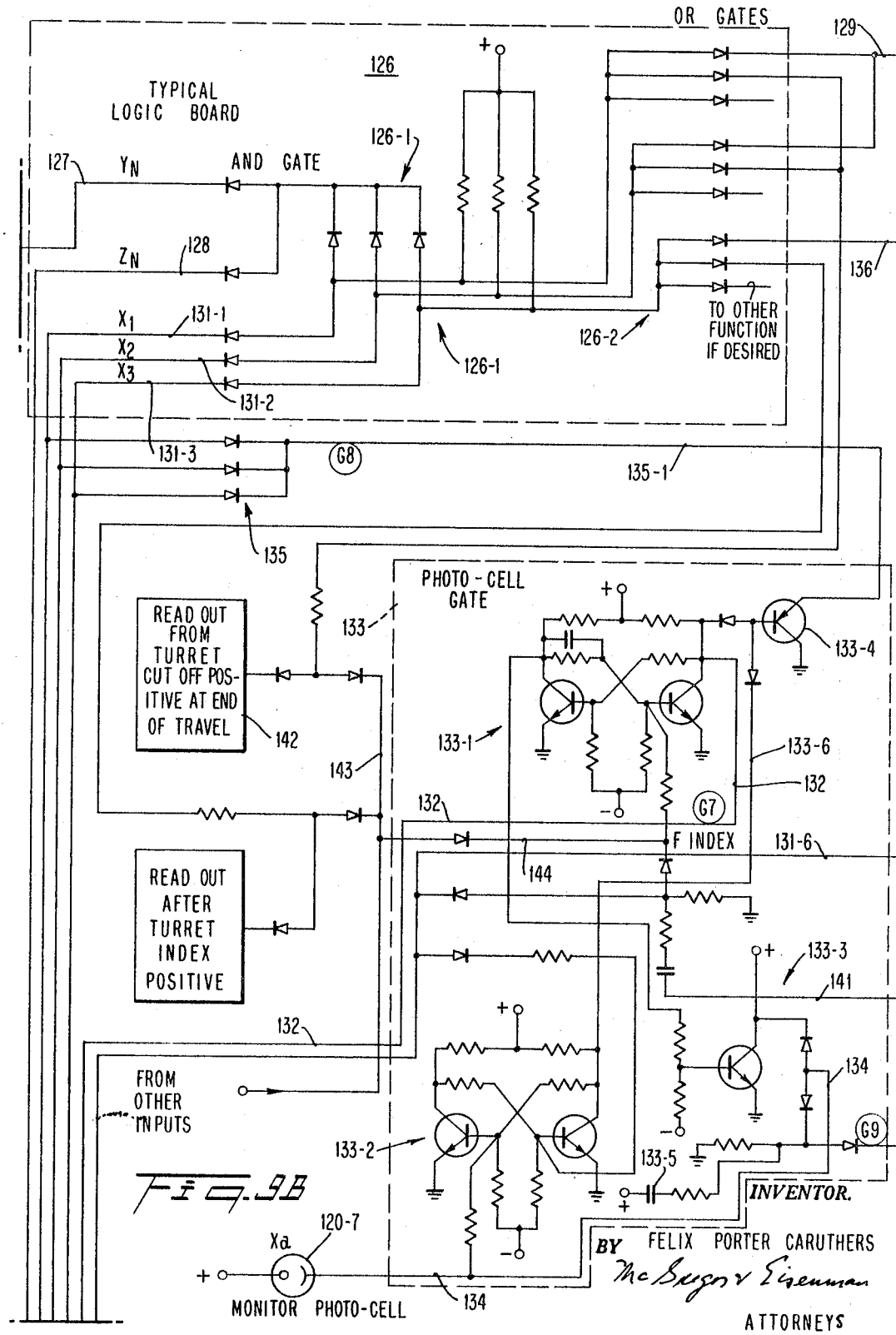

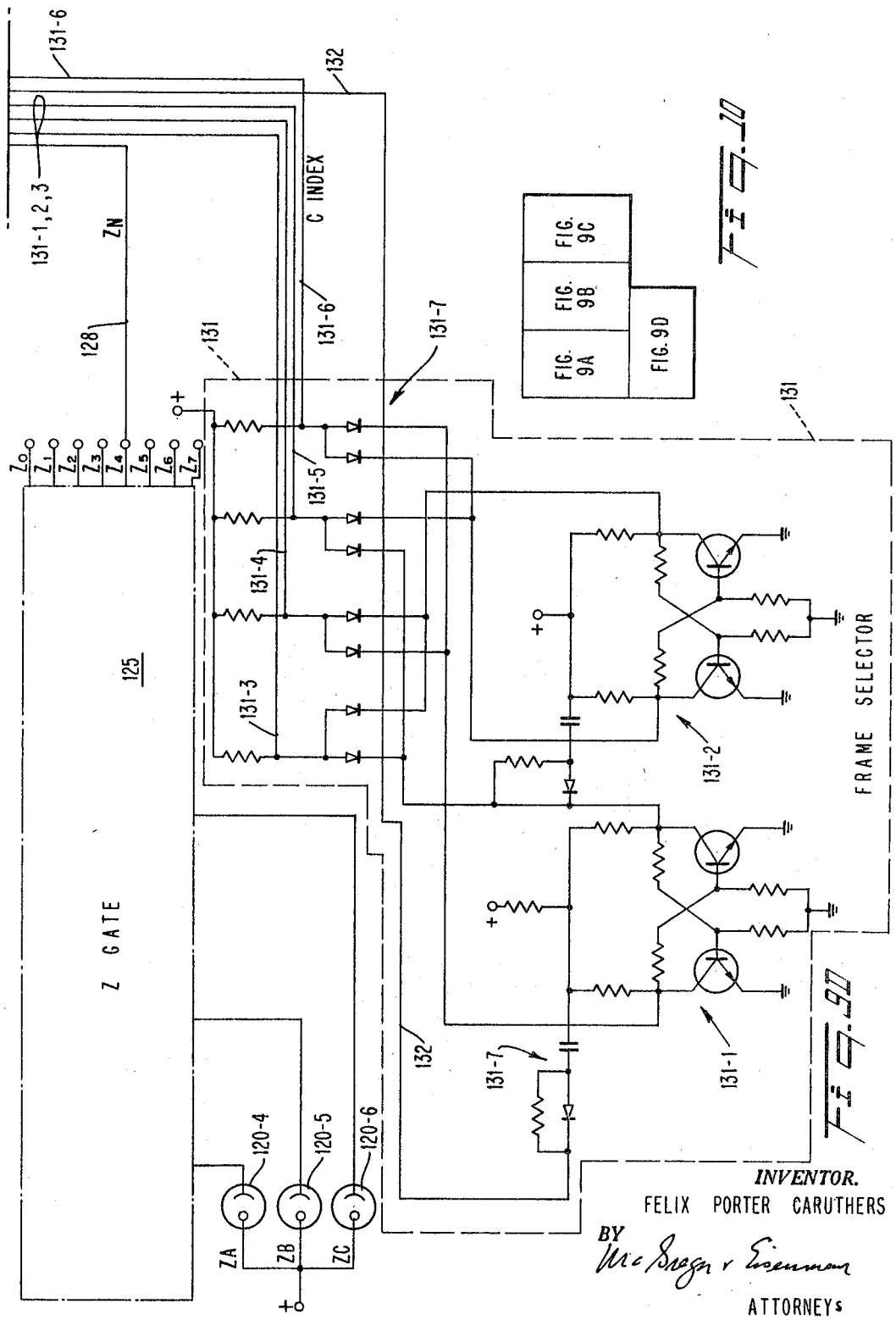

June 6, 1967  F. P. CARUTHERS  3,324,364
APPARATUS FOR THE CONTROL OF MACHINE TOOLS OR THE LIKE
Filed Aug. 16, 1960  18 Sheets-Sheet 16

INVENTOR.
FELIX PORTER CARUTHERS
BY McGregor & Eisenman
ATTORNEYS

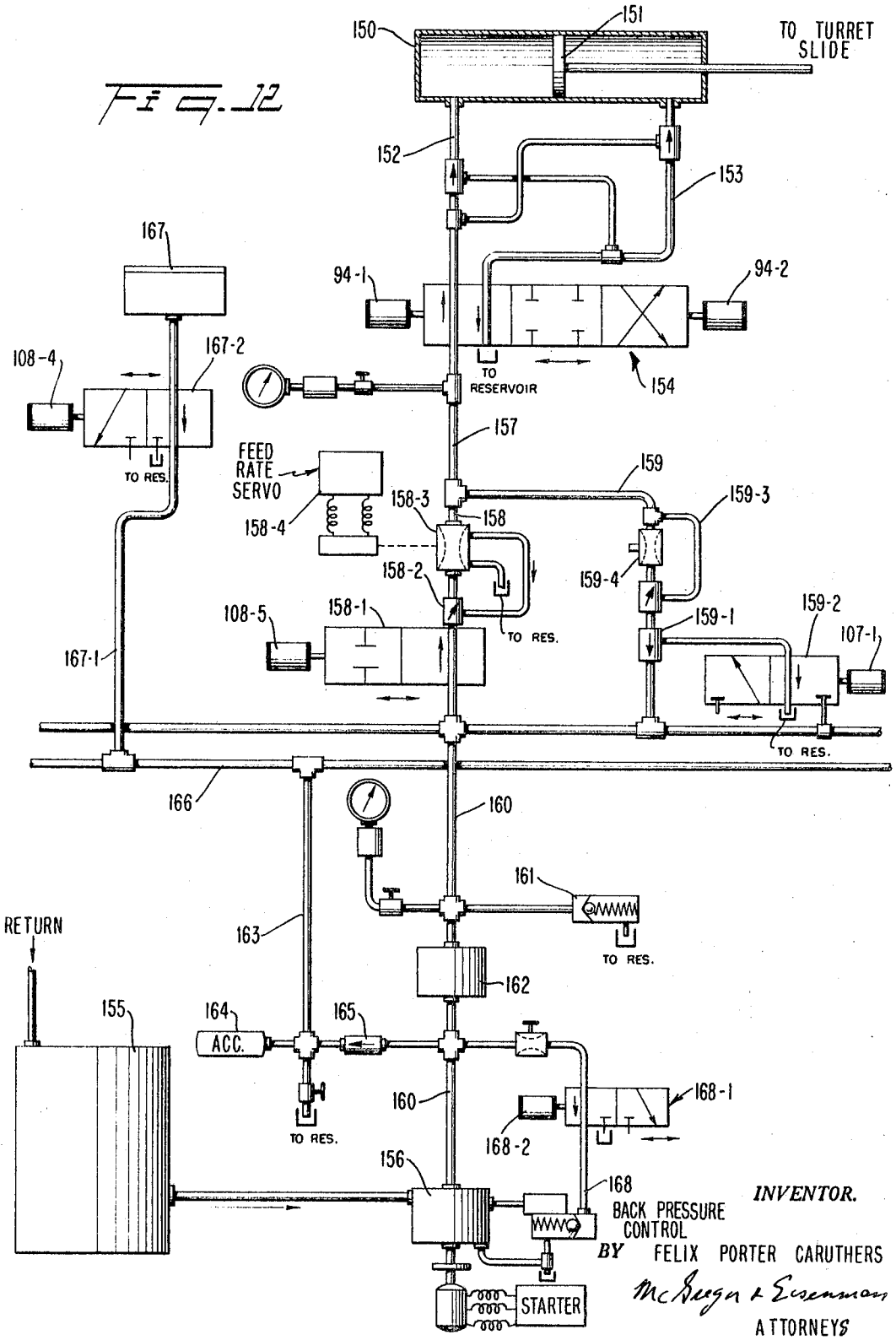

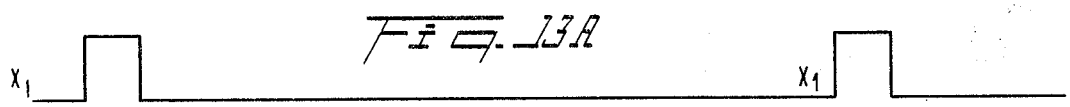
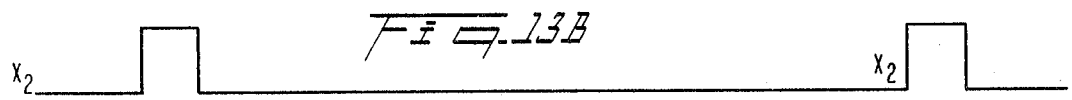
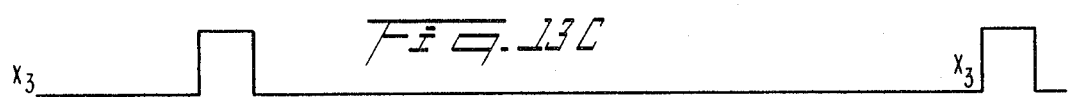
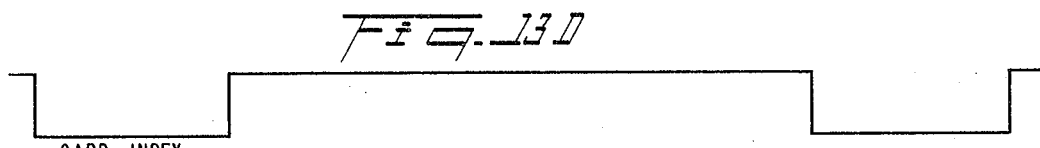
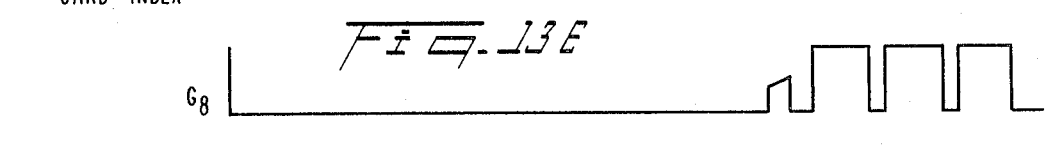
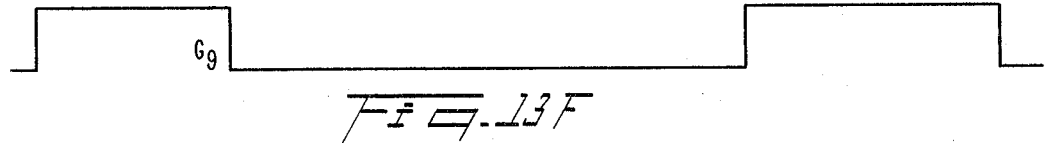
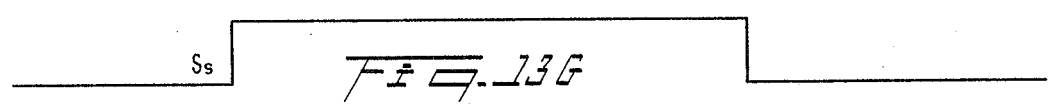
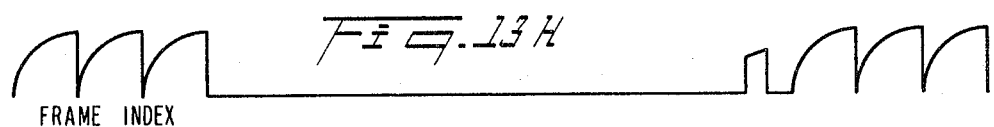
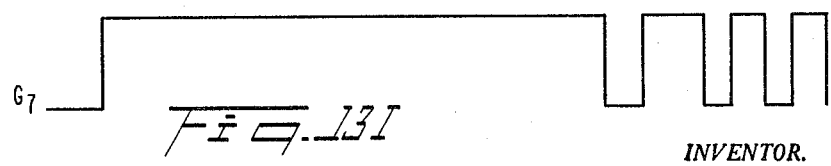

United States Patent Office 3,324,364
Patented June 6, 1967

3,324,364
APPARATUS FOR THE CONTROL OF MACHINE TOOLS OR THE LIKE
Felix Porter Caruthers, Muttontown, N.Y., assignor to Teledyne, Incorporated, Hawthorne, Calif., a corporation of Delaware
Filed Aug. 16, 1960, Ser. No. 50,035
8 Claims. (Cl. 318—18)

This invention relates to methods and apparatus for precisely controlling the positions of movable members. More particularly, it relates to the control of apparatus, including any of a variety of machine tools, throughout complex operational programming.

Many approaches have been made to the problem of precisely positioning movable members. The automation of machine tools such as lathes, automatic turret lathes, boring and drilling machinery, grinders, welders, flame cutters and milling machines presents a particularly critical motion and position control problem because the sources for introducing errors are many and the demand for versatility and accuracy are great. In general, depending in many cases on the type of machine tool involved, the attempts have not resulted in fully satisfactory automatic control. For example, in certain of the techniques applied heretofore, mechanical devices such as cams, dogs, limit switches, and the like have been used for controlling the relative positions of the work and the cutting tools. These systems have limited versatility, particularly in the control of complex machines such as turret lathes. For one very specific type of lathe operation, tracer contour turning has been utilized to effect partial automatic control. In addition to being highly specialized and not effecting complete control of the machine tool, this system is costly and slow in set-up. Still other systems, based on principles of digital positioning control have been developed in which an entire cycle of operation of a machine tool is predetermined and recorded on a programming tape such as a magnetic or a perforated tape. Such techniques are applicable only in limited situations in which the location of the points of the cutting tools can be accurately determined with reasonable effort. Milling machines and jig borers are particularly subject to this type of control. The system, however, becomes prohibitively costly and difficult to implement where the position of the cutting tool cannot be accurately determined and particularly where a number of cutting tools are brought into play in a sequence of operations, as in a turret lathe, for example.

Accordingly, it is one object of the present invention to provide a method and apparatus of a highly versatile nature for the automatic control of movable members, such as those of machine tools, particularly those having a number of sequentially performed operations.

Another object of the invention is to provide a method and apparatus for the control of movable members such as machine tool parts in which the position of the cutting tool or tools need not be accurately known before the operation is begun.

Another object of the invention is to provide a method and apparatus for the control of machine tools which can be carried out by machinists without resort to complex quantitative programming data normally prepared by specialists and not readily susceptible of correction in situ.

Still another object of the invention is to provide a highly versatile method and apparatus for the control of machine tools which do not require the introduction of quantitative information in the programming control, the program being set up only on the basis of functional commands.

Still another object of the invention is to provide an improved apparatus for positioning movable members in which both digital and analogue techniques are consolidated in a single function.

Still another object of the invention is to provide an improved hydraulic system for driving movable members at a plurality of rates which are co-related with the operation of an electronic positioning system and which facilitates the bringing of a movable member to a precise end point.

The above and other features and objects of the present invention will be readily understood by those skilled in the art, having reference to the following specification of representative embodiments thereof taken in conjunction with the accompanying drawings, in which:

FIGURE 1 is a view in perspective and partly schematic in nature of a turret lathe to which the automatic control system of the present invention has been applied;

FIGURE 2 is a view essentially in front elevation showing the control panel for the control system applied to the turret lathe of FIGURE 1;

FIGURE 3 is a front view in enlarged scale of one of the dials of the control panel of FIGURE 2 and includes, in schematic representation, control elements operated by the dial;

FIGURE 4 is a view in perspective of a key or card which is one of a plurality of keys carrying machine tool intelligence for programming the control system;

FIGURE 5 is a block diagram of one of three substantially duplicate channels of the control system as it is applied to a turret lathe having three slides;

FIGURES 6A, 6B, 6C, 6D, 6E, 6F and 6G are schematic wiring diagrams showing the several sections of one of the channel controls for the machine tool controller;

FIGURE 7 is a layout diagram showing how the schematic diagrams of FIGURES 6A through 6G are assembled side by side to form a single schematic diagram of a single control channel;

FIGURES 8A, 8B, 8C, 8D, 8E, 8F, 8G and 8H are a series of voltage curves illustrating the operation of portions of the circuitry of FIGURES 6A through 6G;

FIGURES 9A, 9B, 9C and 9D are circuit diagrams of the program logic section of the machine tool controller;

FIGURE 10 is a layout diagram showing how FIGURES 9A, 9B, 9C and 9D are assembled side by side to form a single schematic diagram;

FIGURE 12 is a schematic diagram of a hydraulic system which is used in conjunction with the electronic portions of the control system to drive the movable members, in the illustrated case, one of the slides of a turret lathe; and FIGURES 13A through 13I are voltage curves illustrating the operation of the circuitry of FIGURES 9A through 9D.

Figure 9A:
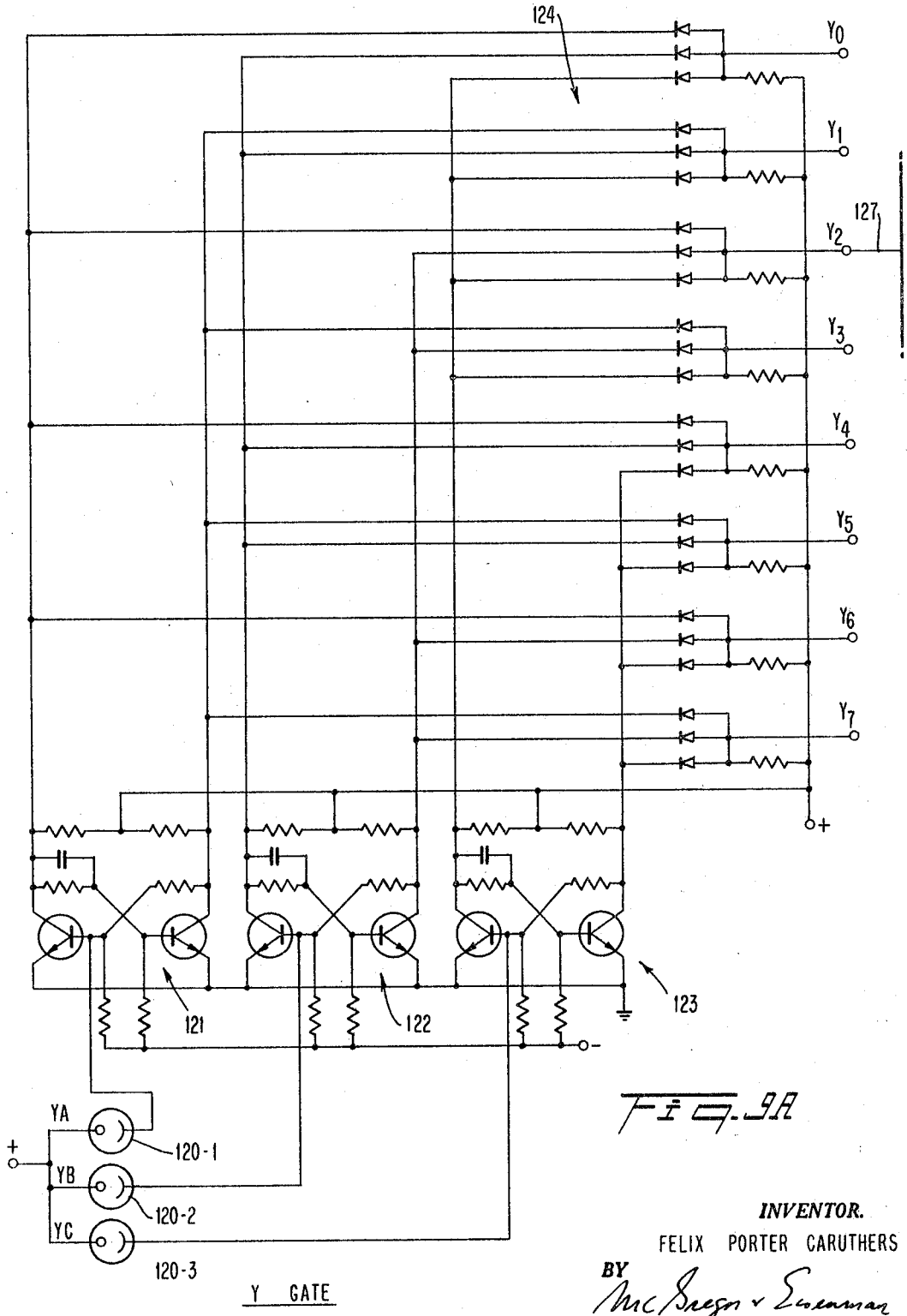

The invention, although applicable to a wide range of positionings or controlling systems, is, for purposes of illustration, shown incorporated in a control system for a turret lathe. Referring to FIGURE 1, there is illustrated a turret lathe 20 including a spindle 21 and guide ways 22, on which a carriage or longitudinal slide 23 and a turret slide 24 are mounted. The turret slide 24 carries a conventional hex nut 25 in the six faces of which cutting tools are mounted and which is indexible in accordance with conventional techniques to present its faces successively to the work W carried by the spindle 21. Mounted on the longitudinal slide 23 is a cross slide 26 carrying a tool holder 27, which, if desired, can carry a single tool or a selection of four tools in its four faces, in which case it is indexible to present the selected tool to the work W.

Each of the slides is individually actuated, the longitudinal slide or carriage 23 being driven on the ways 22 by an actuator 28. The turret slide 24 is driven on the ways 22 by an actuator 29 and the cross slide 26 is driven in suitable ways formed in the long slide 23 by means of an actuator 30. In normal manual operation, the tools in the carrier 27 and in the turret hex nut 25 are brought to the work W to perform various operations thereon.

In accordance with the present invention, the desired program or cycle of cutting operations can be carried out automatically. To this end, the positions of each of the slides are sensed by transducers, the carriage or long slide 23 being sensed in its position by a transducer 31, the turret slide by a transducer 32 and the cross slide by a transducer 33. Each of these transducers, as described more fully below, having reference to FIGURES 11A and 11B, comprises a pair of relatively movable portions, one carried by the movable slide and the other by the supporting member of the machine tool on which the slide moves. In the illustrated arrangement, the transducers take the form of inductive transducers in which magnetic cores are connected to move with the slides and inductive windings are fixed to the supports. Such transducers are described and claimed in the applicant's co-pending application, Ser. No. 27,618, filed May 9, 1960, now Patent 3,218,591.

In the diagrammatic illustration of FIGURE 1, the machine tool controller includes a key or card reader 34 into which keys or cards defining a program of operation are inserted. The key reader is, for convenience, mounted in a control panel 35 (shown in greater detail in FIGURE 2) mounted at the control station of the machine tool. The control panel houses a turret control section 36, a carriage or long slide control section 37, and a cross slide control section 38.

Information from the key reader 34, derived from keys or cards which can be of the type illustrated in FIGURE 4, is fed by an operation command conduit 39 into a program logic section 40, which translates the coded information into machine tool commands.

The program logic section 40 feeds information selectively into three servo controls 41, 42 and 43 called turret servo, carriage servo and cross slide servo, respectively, in accordance with the intelligence contained in the key reader. Each of the three servos is connected to an actuator, a position sensing transducer and a control section in the panel 35. Thus, the turret servo control 41, for example, is connected by a conduit 44 to the turret control section to reecive command information therefrom; to the turret position transducer 32 by a conduit 45 to receive feedback information therefrom as to the actual position of the turret slide; and to the turret slide actuator 29 by a conduit 46 to drive the slide in accordance with the error signal between the command and position information. It will be understood that the long or carriage slide servo control 42 and the cross slide servo control 43 are similarly connected to their corresponding control sections 37 and 38, their position transducers 31 and 33, and their actuators 28 and 30.

Information indicating completion of any given control operation, regardless of which slide, is fed by a conduit 47 from the program logic section to the key or card reader 34. Thus, it will be understood that the key or card reader 34 will initiate sequentially the commands which cause the movable members or slides to begin their motions toward the work; the control sections 36, 37 and 38 will introduce information indicating, among other things, the desired end points of the movements; and the position transducers 31, 32 and 33 will indicate the actual positions of the slides. It should be noted that the intelligence encoded in the keys is only functional in nature, that is, it is devoid of quantitative intelligence indicative of dimensions of the finished part. Dimensional intelligence, or, more particularly, the end point positions of the slides (and hence the cutting tools) for each of the cutting operations, is contained in the control sections 36, 37 and 38 in the panel assembly 35.

These control sections, which are housed in the control panel 35, are shown in greater detail in FIGURE 2. The control panel 35 is pivotally mounted in suitable brackets 35a and 35b secured to the frame of the machine tool so that the panel can be swung outwardly for accessibility by the operator or the set-up man and also for servicing.

The turret control section 36 includes a series of micrometer dials 36–1, 36–2, 36–3 . . . 36–16. Each of these dials is capable of carrying intelligence representative of an end point for a cutting operation and of a feed rate, i.e., rate of movement of a slide and the tools carried thereby. In addition to these dials, the turret control section includes a micrometer dial 36–17 for determining the normal or inactive position for the turret, a manual control switch 36a for operating the turret slide independently of automatic end point control and a turret control switch 36b for indexing the turret.

Similarly, the carriage or long slide control section 37 includes a series of micrometer dials 37–1, 37–2 . . . 37–8 for setting end points for the travel of that slide, a manual control switch 37a and a micrometer dial 37–9 for determining the normal or inactive position of the slide. In addition, collet and stock controlling switches 37b and 37c are provided. The third or cross slide control sections 38 includes a series of end point micrometer dials 38–1, 38–2 . . . 38–8, a manual control switch 38a and a normal position dial 38–9. Also included on this panel are various controls such as coolant (off-on) 38b, spindle speed 38c, dwell interval 38d, starting switch 38e, emergency stop 38f, spindle stop 38g, spindle reverse 38h, and the like.

Each of the several micrometer dials is identical in construction and each includes, as best seen in FIGURE 3, a centrally located pilot light 48, which is energized when that particular dial has assumed control of a slide, a feed rate control knob 49, the pointer 49a of which works in conjunction with calibrations 49b to control the speed at which the slide moves to its end point; and an end position dial 50, which operates coarse and fine command transducers, the complementary adjustment of which appears on an indicator 50', including a vernier indicator. The structural details of this dial assembly are disclosed in the applicant's co-pending application, Ser. No. 30,662, filed May 20, 1960 Patent #3,007,343.

For purposes of the present disclosure, it shall suffice to indicate that the feed rate knob 49 controls a feed rate potentiometer 51 and the knob 50 controls a pair of command position transducers including a coarse transducer 52 and a fine transducer 53, all shown diagrammatically. These transducers are also indicated schematically in the schematic diagram of FIGURE 6A.

The mechanical arrangement of the control knob 50 and the coarse and fine transducers 52 and 53 is such that, with the knob pulled out, one-half inch steps of motion for the slides are provided for the coarse transducer 52 by a detent arrangement and, with the dial pushed in, the fine position transducer 53 is activated to interpolate over the one-half inch lengths. Each dial is calibrated in divisions of .001 inch and, because the resolution of the system is effectively infinite, the end points of motion may be changed by one to two ten-thousandths of an inch by interpolating the divisions. The entire range of travel of the slide, which, in a representative case is 30 inches, can therefore be covered in a few turns of the dial, with only the coarse transducer being actuated when the knob is pulled outward and the fine transducer when the knob is pushed inward.

A representative key or card for the system is indicated by the numeral 54 in FIGURE 4. This key includes a shank portion including a series of perforations 54a, the last of which is consolidated with a locking detent 54b for holding the key in position in the key reader 34. A tab or finger grip 54c at the outer end of the shank carries a written legend 54d indicating the command or function encoded by the perforations 54a. The keys, which are selected from a suitable storage tray (not shown) in accordance with the operations which the setup man wishes the machine tool to perform, are inserted in suitable slots in a key reading drum 55, which is part of the key reader 34 in the turret control section of the panel 35. The key reader, in the illustrated arrangement, operates photoelectrically by light which passes through the perforations 54a of the respective keys. Approximately three dozen different keys will, for example, program any operation a three slide turret lathe is capable of performing. In this connection, it will be recalled that the keys do not carry dimensional intelligence. The operator or set-up man, therefore, need have no knowledge of the meaning of the punched holes. The tab at the end of the key carries a legend describing what function any given key will initiate.

In the illustrated arrangement, seven photo cells 120-1 ... 120-7 (FIGURES 9A, B and D) are used to read the holes in the keys, which serve to establish a particular logic pattern in the program logic section 40, which functions as a computer. Because the keys supply only a function or operation known to the computer and do not operate functions directly, any combination of slide movements and machine functions may be programmed simultaneously. By way of example, a key bearing the legend "End Cycle Normal" moves all three slides to their normal position (all tools clear of the workpiece), stops the spindle, applies the spindle brake, turns off the coolant and resets the system by means presently to be described, so that the next end point called for will appear on the first dial of each slide control section.

There are seven possible hole locations in each key, one of which is used to monitor the light source and to insure that the key is properly inserted in the drum 54. The remaining six hole positions are divided into two groups of three each. Each group has eight possible variations and when connected to a binary-to-decimal converter will read digits from 0 to 7. By the inclusion of an electronic "frame" selector, described below, a single key will program a series of operations. Considering the frames as "X" (and utilizing four per key) and the two groups of photocells as "Y" and "Z" respectively, the key reader 34 is furnished with a program made up of three independent digits. A total of 63 combinations are available from the key reader, with each key programming up to three operations and supplying an "operation complete" signal from the fourth frame. One combination, i.e., $Y_7Z_7$, is not used as it would indicate "no key." This particular combination is, therefore, utilized to inform the computer to index to the next key. Accordingly, the key reader will skip any position where no key has been inserted.

By providing places for 36 keys on the key reader, a possible 108 separate operations of 63 different types are provided and may be used in any desired sequence.

Figure 11A:
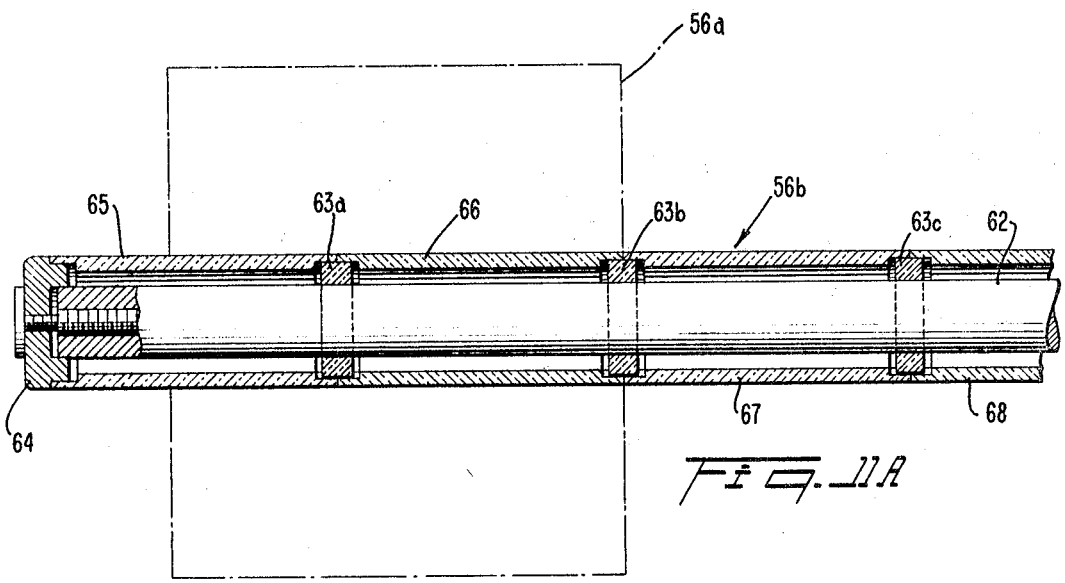
FIGURES 11A and 11B are views in longitudinal section of a transducer assembly which can be used, together with the circuitry of FIGURES 6A through 6G, to detect the positions of the slides of a turret lathe or of any other movable members with which the system of the present invention might be utilized.
Figure 11B:
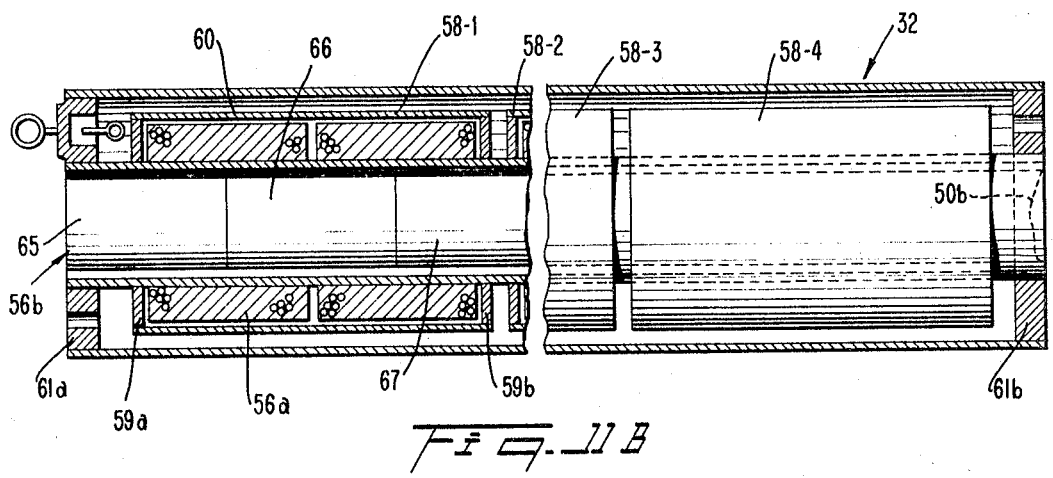

Referring next to FIGURES 11A and 11B, there is illustrated a transducer assembly of the type represented by the numerals 31, 32 and 33 in FIGURE 1. Each transducer includes a fixed coil assembly 56a and movable core assembly 56b, both being partially illustrated in FIGURE 11B. The coil assembly 56a is adapted to be supported directly by the frame of a machine tool. The coil assembly includes a tubular stainless steel mandrel or center 57 supporting a series of coil sections 58-1, 58-2, 58-3 and 58-4. Each section includes a pair of coils and a pair of magnetic end rings or washers 59a and 59b supporting a cylindrical shield 60 formed of magnetic material and slotted axially. The slots, which are not illustrated in the figure, reduce hysteresis losses and afford a path through which the electrical leads to the coils may be brought out, to connect each pair of coils in the control circuit described below. By virtue of the illustrated arrangement of the fixed portion of the transducer assembly, the capacity is symmetrical and the inductance, as well as the mandrel and core losses, are fixed. Therefore, the zero phase frequency of a plurality of coils can be matched within close limits, say, five cycles. Also, there can be connected in parallel a large number of coils for any given excitation frequency.

In assembling the fixed coil assemblies 56a, it will be observed that movement of the coil assemblies apart or together on the mandrel 57 affords an adjustment for mutual inductance. Also, by moving the end washers or pieces 59a and 59b of each coil assembly along the axis of the mandrel, core and mandrel losses can be corrected. Preferably, the voids between the shield 60 and the mandrel 57 which is not filled by the coil assembly, is filled with a potting compound injected through suitable openings in end pieces 61a and 61b.

The movable portion 56b, best illustrated in FIGURE 11, includes a central tubular core portion 62, carrying along its length a plurality of spacers 63a, 63b, 63c and, at either end, an end piece 64. Carried by the end piece and the spacers, working from left to right in FIGURE 11A, are a series of cylindrical sleeve portions 65, 66, 67, 68, etc. The sleeve portions are alternately non-magnetic and magnetic, proceeding along the length of the unit. In order to afford a continuous outer surface for the movable portion 56b, the respective sleeve elements 65, 66, 67, etc., are notched or recessed on their inner end surfaces to rest on the end pieces 64 and spacers 63a, 63b, 63c, etc. Preferably, the recessed portion of each element is slightly in excess of one-half of the length of the spacers. The unit may assume any length compatible with its structural integrity, and in the illustrated arrangement the alternate magnetic and non-magnetic sections are one inch in length, thereby to yield, in an operative transducer system, output responses for each one-half inch of travel. The transducer of FIGURES 11A and 11B described in greater detail and is claimed in the applicant's co-pending application, Ser. No. 27,618, filed May 9, 1960. Essentially, the function of the transducers is that of position sensing in order to determine when the desired positions in the sequence of operation of the machine tool have been achieved. This includes in particular sensing the positions of the slides of the machine tool at the precise point at which a cutting tool has cut the work to the desired size.

It will be observed that the coil sections 58-1, 58-2, 58-3 and 58-4 of the transducer coil sections appear schematically in FIGURE 6D. These coil sections are energized by a carrier signal $C_A$ impressed across a pair of terminals identified in FIGURE 6D as $C_AC_B$ from a source 69.

Referring to FIGURES 6D and 11A and B, the transducer 32 is arranged so that the one-inch magnetic slugs, which are spaced apart by non-magnetic sections, work over one-half inch of travel in the center of the corresponding coil section. It will be seen, for example, that the magnetic section 66 is centered in the coil section 58-1 in FIGURE 11B. The transducer is at this point functioning with the coil section 58-1 connected in the system by virtue of the transducer selector circuit 70 (FIGURES 5 and 6D). This magnetic section 66 remains connected in the circuit for motion of a quarter of an inch to the left and to the right, or a total of one-half inch in all. Assuming the core 56b is moving to the left in FIGURE 11B, after the section 66 moves a quarter of an inch, the next magnetic slug to the right identified by the reference numeral 68 in FIGURE 11A, will be moving into the center portion of the coil 58–2, at which point the transducer selector circuit 70 will connect that coil into the circuit. In a like manner, the coil sections 58–3 and 58–4 come into operation with the next successive magnetic section, after which another magnetic section will be approaching the optimum position in the first coil 58–1. In this fashion, virtually unlimited travel of the transducer core can be obtained without loss of linearity.

The transducer selector circuit 70 comprises a series of four transistor and diode circuits 70–1, 70–2, 70–3 and 70–4, connected to the center taps of the respective windings 58–1 . . . 58–4. These circuits which function as "AND" gates, are so arranged that, as successive windings are clamped to ground and hence rendered operative, a magnetic core is appropriately positioned therein.

Referring now to both the block diagram of FIGURE 5 and to composite circuit diagram of FIGURES 6A, 6B . . . 6G (assembled in accordance with FIGURE 7) of the machine tool controller, the conduit 71 connects the selector circuits 70–1 . . . 70–4 to the comparator and counter circuits 74, 75, 76 and 77. The block diagram represents one slide control channel (in this case, the turret) of the three which constitute the control system for a three-slide or turret lathe. This basic channel can, it should be understood, be used for position control purposes in other control systems in which precise positioning is required.

The coarse control transducer or input dial 52 supplies in digital form, i.e., one-half inch of detented steps of travel of the core 31–1 (FIGURE 6A) represented by corresponding voltage steps, information which has been manually introduced by means of whichever of the dials on the control panel has been selected by a dial selector stepping switch 72. This switch is a multiple deck, multiple contact switch having contacts to connect the control channel to the selected dial. In the illustrated switch, there are sixteen contacts in each deck corresponding to the sixteen dials 36–1 . . . 36–16 of the turret control section 36.

The output of the coarse dial or transducer 52, takes the form of a voltage from a differential transformer in which core travel is divided by suitable detent means in the dial assembly into a plurality of positions each affording a predetermined voltage, all as set forth in said copending application Ser. No. 30,662. The transformer is connected through the switch 72 and a conduit 73 to the comparator 74, which includes a multiple winding transformer 74–1, the primary winding of which is connected to the primary windings of the coarse dial transducer 52 and the carrier signal from the source 69 is impressed across both of these primary windings. The secondary windings of the transformer 74–1 are each connected to the output of the secondary windings of the coarse transducer 52 through a series of resistors 74–2, 74–3, 74–4, etc. Connected to each of the terminals of each of the windings of the secondary of the transformer 74–1 are a series of bilateral transistors 74–5, 74–6, 74–7, 74–8, etc. (FIGURE 6C), the bases of which are connected through resistor networks and a transistor amplifier stage to a series of counters 75 and 76 (FIGURE 6C) and 77 (FIGURE 6D). The bilateral transistors 74–5 and 74–6 are connected to the counter section 75 via conductors 75–1 and 75–2, connected respectively through amplifier steps 75–3 and 75–4 to opposite sides of a bistable or one shot multivibrator 75–5. The bilateral transistors 74–7 and 74–8 are similarly connected to opposite sides of a bistable multivibrator 76–5 and the transistors 74–9 and 74–10 to a bistable multivibrator 77–5. The multivibrators are identical and are coupled in sequence by conductors and coupling networks 75–6 and 76–6, so that they fire in sequence, thereby to store the count, adding or subtracting as required. The conduit 73 is also connected to a comparator tube 74–11 (FIGURE 6A), which yields an output when the coarse transducer voltage and the counter controlled voltages attain a predetermined relationship, in this case a null.

The transistor-diode circuit 70–1 for the position transducer winding 58–1 is connected by the conductor 71–1 of the conduit 71 to the conductor 75–1 joining the comparator 74 and one side of the multivibrator or counter section 75. The conductor 71–2 of the conduit 71 connects the conductor 75–2 to the second transducer winding 58–2, and the conductors 71–3 are similarly connected to the conductors leading to the two sides of the counter section 76, so that the first four counting stages are coupled to the four winding sections for selector control. The fine dial for transducer 53 is connected through the master stepping or selector switch 72 by a conductor 78 to a bridge follower circuit 79, consisting of a single transistor 79–1, the output of which is connected by conductor 80 to an amplifier 81 and in parallel therewith by a conductor 82 to an amplifier 83. The amplifier 81 includes a pair of transistor amplifier stages 81–1 and 81–2, an amplifier 83 and the single transistor amplifier stage 83–1.

The output of the single stage amplifier 83 is connected by a conductor 84 to a pulse former 85 (FIGURE 6B). The output of the two-stage amplifier 81 is connected by a conductor 86 to a transfer switch circuit 87 (FIGURE 6E). The pulse former circuit 85 includes a transformer-input, carrier-sustained ring demodulator 85–1, the output of which is connected by a conductor 85–2 to a follower circuit 85–3, which feeds into a multivibrator 85–4. A shaped pulse output from the pulse former, which effectively isolates the system against line transients and the like, is fed by a conductor 88 to the counter circuit 75 and more particularly to the control electrodes of the transistors of the bistable multivibrator 75–5. The input end of the pulse former 85 is the center tap of the primary winding on the input transformer 85–5, the ends of which are connected through transistors 85–6, and 85–7 and conductors 89 and 90 to each of the counters 75, 76 and 77 and, by conductors 91 and 92 (FIGURES 6D and 6G) to a direction gate circuit 93 and to a direction control circuit 94.

By these connections, the direction control circuit 94 is capable of conditioning the pulse forming circuit and counters to count in the appropriate direction depending upon the direction of movement of the turret slide 24 and hence the turret slide position transducer 32. The direction control circuit 94 includes a pair of solenoid control elements 94–1 and 94–2 (which also appears in the hydraulic control diagram of FIGURE 12) which are actuated by amplifier stages 94–3 and 94–4, respectively, the inputs to which are derived from the direction gate circuit 93. The direction gate circuit includes a multivibrator 93–1, opposite sides of which are coupled to the opposite sides of the counters via conductors 91 and 92, as well as to the forward and reverse amplifier channels 94–3 and 94–4 of the direction control circuit 94. The control inputs to the direction gate multivibrator are from a DC amplifier 97 through the conductor 96.

The DC amplifier 97 includes a carrier-referenced, ring demodulator 97–1 to convert DC from a filter circuit 97–2 to AC, which is fed into an amplifier stage 97–3, the output of which feeds into a ring modulator circuit 97–4 for converting the phase-sensitive AC signal to DC in the conductor 96 to the direction control circuit. A common carrier signal is impressed across the corresponding diagonals of the demodulating and modulating circuits through the primary transformer windings 97–5 and 97–6, this carrier signal also being the basic carrier for a ring demodulator circuit 87–1 of the transfer switch circuit 87, the output of which is connected to the DC amplifier by the conductor 98, to the center tap of the transformer secondary winding 97–7. The direction gate circuit 93 is coupled to the secondary winding 97–8 of the transformer of the ring modulator 97–3 through the conductor 96, the signal being a DC signal formed from the phase-sensitive AC so that it will be positive when the slide is on one side of its end point and negative on the other. The input is fed by the conductor 96 through a filter and amplifier circuit 93–2 and 93–3 in the direction gate circuit 93 to the multivibrator 93–1, the outputs of which control the forward and reverse direction valve actuators 94–1 and 94–2 through the amplifier stages 94–3 and 94–4 of the direction control circuit 94.

A second output from the DC amplifier 97 is derived from the half wave rectifier circuit 97–9 controlled by an "AND" gate circuit 97–10 which receives signals via the conductor 115 from the feed rate control potentiometer 114 (FIGURE 6A). The gate is open when the carrier is negative and closed when positive. The output of the circuit 97–9 is fed by a conductor 109 to a multivibrator 108–1 in the cut off control circuit 108. The outputs of the multivibrator 108–1 are amplified by amplifiers 108–2 and 108–3 which drive a clamp valve solenoid 108–4 and a cut-off valve solenoid 108–5. The circuit 97–9 of the DC amplifier serves to provide a signal which anticipates the null of the fine transducer bridge circuit so that the hydraulic system may be actuated in anticipation thereof, i.e., as a function of traverse or feed rate speed. Thus, if the feed rate is high, the system will be actuated earlier to compensate for the additional time necessary to bring the moving parts to rest.

The transfer gate 102 is connected by conductor 106 to a traverse control circuit 107 and the DC amplifier 97 is connected to the cutoff control circuit 108 by conductor 109. The counters 75, 76 and 77 are each connected by a conductor 110 to a reset switch 111 on the control panel 35.

The pilot or indicator light 48 of the dial 31–1 is connected through the switch 72 to a suitable energizing source. This same source also energizes a traverse switch 112, which is connected by a conductor 113 to a traverse control circuit 107, having a solenoid valve 107–1.

It will be recalled that the transfer switch 87, which feeds the DC amplifier 97, receives the output of amplifier 81 from the bridge follower 79 and fine dial transducer 53. The comparator 74 is also connected by a conductor 100 to an amplifier 101, the output of which is connected by a conductor 101–1 to the transfer gate circuit 102, which includes a transformer input, transistor network 102–1 feeding a control circuit 102–2 through a filter network 102–3. The amplifier 101 is also connected by a conductor 101–2 to the transfer switch 87, which is, in turn, connected to a transfer gate circuit 102 by conductors 103 and 104. The conductor 100, it will be recalled, carries the output of the comparator stage 74–11 which is set to conduct when the voltage from the coarse dial transducer 52 is matched by the voltage of the count as the successive transistors 74–5, 6, 7, 8, 9 and 10 are actuated by their corresponding counter circuit, which, it will be recalled, count the half-inch sections of the position transducer, i.e. nulls of the bridge circuit including the position transducers 32 and the output of the coarse dial 52 as the former is moved by its slide. The transfer switch and gate circuits 87 and 102 are actuated when the coarse count is completed, thereby placing the fine dial bridge circuit including the fine dial transducer 53 and the position transducer 52 in control of the system. The next true null of that circuit is, of course, the end point of the slide.

Thus, it will be understood that the control system functions as a digital system (the coarse count of the nulls) and as an analogue sysem (the nulling fine dial bridge circuit) with the two functions being keyed together. The digital analogue conversion operates as follows: The coarse input dial 52 delivers "coarse" voltages representative of the coarse dial setting to the comparator 74 which compares the dial setting voltage with accumulated voltage steps representative of the count of the half-inch segments of the transducer 32. The voltages which appear in the coarse and fine dial portions of the system are shown in the curves of FIGURES 8A through 8H. FIGURE 8A shows the voltages which appear as the half-inch sections of the position or slide transducer 32 move through their nulls, the negative slope being forward movement, the positive reverse. The voltages which are the difference between the coarse dial voltage and the comparator and counter voltage are shown in FIGURE 8B. The voltage in the conduit 100 (FIGURE 8C) shows the transfer gate pulse and FIGURES 8D and 8E the gate and switch pulses appearing at G1 and G2, which are coarse and fine signals. The voltage at the outpoint of the transfer switch (the input to the ring demodulator 87–1) is shown in FIGURE 8E. In FIGURE 8F, the coarse and fine voltages appearing at the input to the ring demodulator 87–1 of the transfer switch 87 are shown, this being a phase sensitive AC signal. In FIGURE 8G, the phase rectified and filtered signal appearing at the input of the ring demodulator 97–1 of the DC amplifier 97 is shown. This voltage includes the voltage steps representative of the approach to the crossover from digital to analogue. It will be observed that one coarse or half-inch step occurs with each switchover to a next winding of the four transducer windings 58–1, 2, 3 and 4.

The voltage in the conductor 96 (FIGURES 6F and 6G) which is the output of the DC amplifier 97 sets the direction gate 93. When the voltage curve of FIGURE 8G crosses zero, the control system has reached the precise end point of the slide. At the point of switchover to the fine signal control, which is just one quarter inch from the end point, the traverse rate is dropped to the feed rate set on the control dial through the potentiometer 114. The "false null" curve, shown in broken lines in FIGURE 8G shows the voltages in the rate function circuit 97–10 and 97–9 of the DC amplifier 97. This circuit, the output of which appears in the conduit 109, effectively advances the null point so that the hydraulic controls are tripped in advance of the true null as a function of the feed rate of the slide. These voltage output curves appear in FIGURE 8H. Because of the half wave rectifications, this signal yields no phase indication.

It will be understood that the analogue-digital system senses position by use of a multi-cycle half-inch transducer. Used in a null bridge circuit, the transducer causes a signal or count for each half-inch of travel. The desired half-inch is selected by counting and storing the number of half-inches of slide movement and comparing this number with that on the manually set dial. The servo system is activated and given direction, depending on whether the difference of the number stored in the coarse system ($N_s$) and the number (i.e., voltage) on the coarse dial ($N_d$) are greater or less than zero. When the slide reaches a point one-quarter inch from the desired end-point $N_s-N_d=0$, actuation of the servo is transferred to the amplified output of the null bridge, and it is this output which drives the servo to the desired end point.

Referring now to FIGURES 9A, 9B, 9C and 9D which are assembled in the manner of FIGURE 10 to form a single circuit diagram, there is shown the logic portion of the system by means of which the information encoded in the keys (FIGURE 4 of the key reader) is transposed into functions. In the case of the illustrated embodiment of the invention, these functions are machine tool commands.

It will be recalled that the key reader includes seven photocells 120–1 through 120–7 (seen in FIGURES 9A, 9B and 9D). The three photocells 120–1, 120–2 and 120–3 constitute the Y gate system and the photocells 120–4, 120–5 and 120–6 constitute the Z gate system. Each combination of three photocells has, in a binary system, eight possible variations which, through binary-to-decimal conversion, will read digits from 0 to 7. Thus, referring to FIGURE 9A, the three photocells 120–1, 120–2, and 120–3 working into multivibrators 121, 122 and 123, respectively, and a diode circuit 124, yield seven output terminals $Y_0 \ldots Y_7$. The photocells 120–4, 120–5 and 120–6 are similarly connected in a multivibrator and diode circuit indicated generally by numeral 125. The outputs from the two diode circuits of the binary systems are connected to logic boards, of which the logic board identified by the numeral 126 (FIGURE 9B) is representative.

In the illustrated arrangement, for purposes of explanation, two of the terminals of the Y and Z gates are shown connected in the logic systems. The terminal Y2 and the terminal Z4 are connected by conductors 127 and 128 respectively, to the logic board 126, which includes an "AND" gate diode matrix 126–1 and an "OR" gate diode matrix 126–2, which yield output voltages in conductors 129 and 136. This portion of the circuit also receives information from a frame index circuit, to be described. This information is identified as X1, X2 and X3 and comes from a frame selector circuit 131.

Figure 9C:
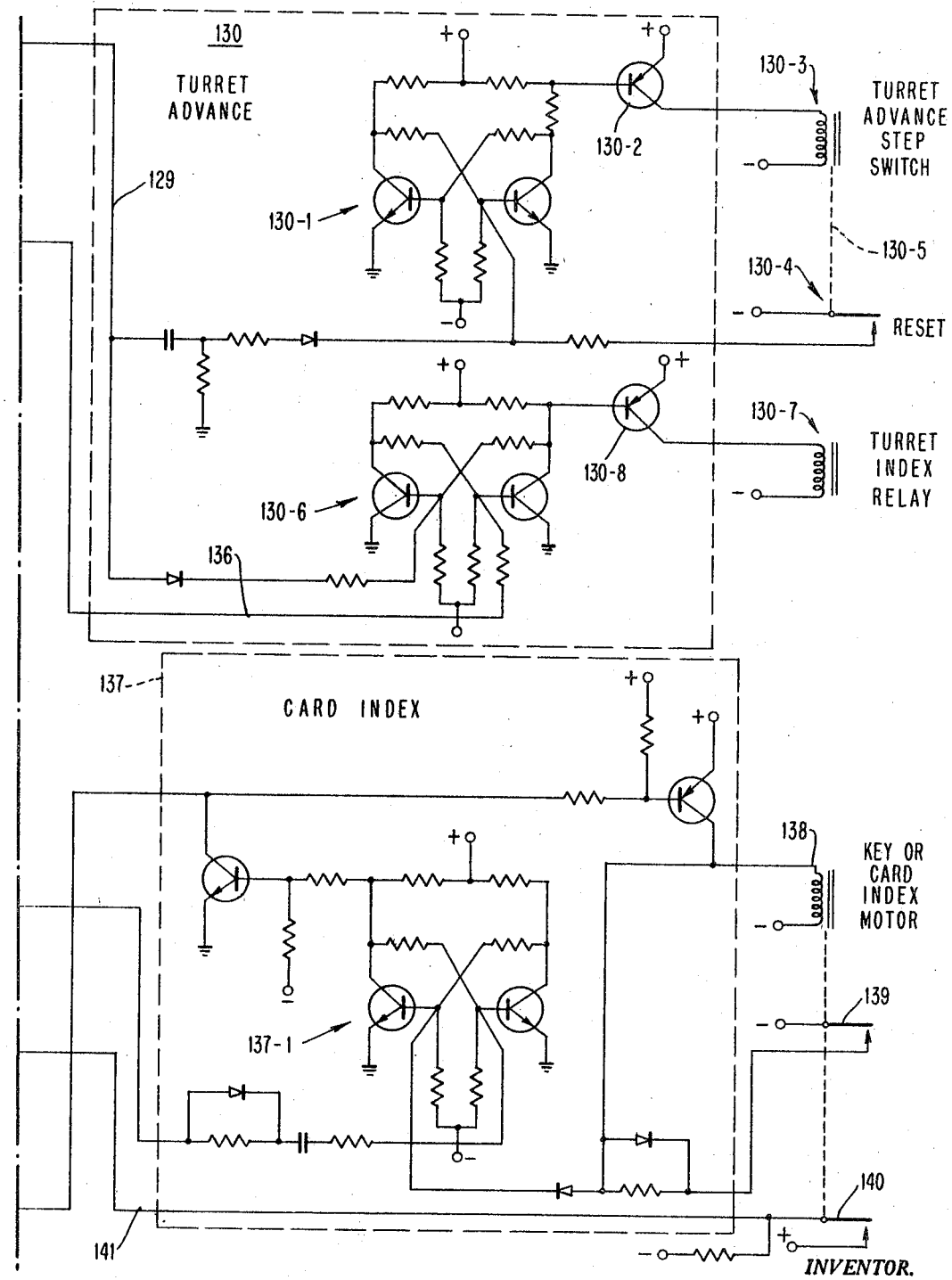

The conductor 129 connects to a turret advance control circuit 130 (FIGURE 9C). The latter circuit includes a multivibrator 130–1 responsive to the signal to energize an amplifier stage 130–2, which actuates a turret advance stepping switch 130–3. The multivibrator 130–1 is connected in a bistable configuration and will remain flipped to energize the solenoid until such time as the turret actually advances. When this occurs, and only after it occurs, the multivibrator is released to flop back to its initial condition, this being accomplished by a reset switch 130–4 coupled by a linkage 130–5 to the turret. When the switch 130–4 is closed, a negative voltage is introduced to the multivibrator to accomplish the electronic switching back to the initial condition.

A second bistable multivibrator 130–6 is connected at one of its control terminals to the conductor 129 and at its other to the conductor 136. The output of the latter side of the multivibrator is connected to the solenoid winding of the turret index relay 130–7 through a transistor 130–8. Normally, a turret is indexed after it has advanced to the work, performed its cutting operation and retreated to its normal position. At this time, the turret can be indexed to present another tool face to the work. Because this is a function associated with normal turret operation, it is possible to combine the turret index function with the turret advance function without requiring an additional programming key.

Such functions as this are accomplished by the frame selector circuit 131, which is capable of performing various series of operations, once initiated by a key. In the illustrated embodiment of the invention, four frames or additional function selections per key were found to be adequate for all machine tool functions. To this end, the frame selector includes a pair of symmetrically triggered multivibrator or selector circuits 131–1 and 131–2, which afford four outputs in the output conductors 131–3, 131–4, 131–5 and 131–6. When paired as illustrated, the multivibrators afford a two-stage binary counter in which the second circuit 131–2 counts once for each two counts of the first circuit 131–1. The functioning of the frame selector 131 and of the photo-cell gate circuit 133 (FIGURE 9B) will be described having reference to FIGURES 13A ... 13I, which are voltage curves taken at selected points in a typical frame selecting cycle. Frame selection occurs, in accordance with the present invention, during each key reading cycle. Initiated by photo-cell 120–7, the frame selector circuit 131 is conditioned to sequence through its four phases. It will be recalled that four phases or functions were arbitrarily selected as the number suited for the particular application of the present invention to turret lathe control, the first three functions representing machine tool operations such as turret advance, withdraw and index, and the fourth representing a card or key index function to drive the key reader to the next stage.

It will be assumed that the first frame X1 is coming up. At this time, the conductor 131–3 will carry a positive voltage and the other three conductors 131–4, 131–5 and 131–6 will be clamped to ground, this being accomplished by the diode matrix 131–7 by means of which any one line will be positive while the other three will be grounded. Because the photo-cell 120–7 has received a light signal and therefore has indexed, the conductor 134 (FIGURE 9B) will energize the bistable multivibrator 133–2. The voltage in the conductor 134 includes a delay function due to the action of the capacitor 133–5. When the multivibrator 133–2 flips, it holds the conductor 132 down to ground (FIGURE 13I) and the transistor 133–4 is back-biased through the conductor 133–6. Each time the conductor 132 goes negative, a pulse clamps the transistor 133–4 to ground (FIGURE 13E). It will be seen that either the multivibrator 133–1 or 133–2 can clamp the transistor 133–4 to ground, at which time the X1 signal line 131–1 is clamped to ground, so it is impossible to get an output signal until the conductor 135–1 goes positive. When this occurs, the X1 signal allows an output to the turret advance and turret index circuits via the conductors 129 and 136.

At the completion of the operation or function, a read out signal from the turret cut-off circuit 142 yields a frame index signal (FIGURE 13H). This signal, introduced into the multivibrator 131 via conductors 143 and 144, fires the multivibrator, only, however, after a time delay afforded by the capacitor 133–7. The conductor 135–1 is then clamped to ground so that the X2 signal line 131–2 carries a control signal, this due to the firing pulse in conductor 132, which is a negative pulse differentiated by the circuit 131–7 (FIGURE 9D) which cuts off both sides of the multivibrator 131–1. It will be recalled that this multivibrator is a symmetrically triggered multivibrator in which an input pulse cuts off the side which is firing, after which the opposite side comes up or fires. It will be recalled also that the multivibrator 131–2 and 131–1 constitutes a 2-stage binary counter. When the signal X2 in the conductor 131–4 comes up (FIGURES 13A, 13C and 13D) an X2 input occurs at the logic board 126 (or other appropriate logic board) and the cycle is repeated through X3 in conductor 131–3. When the fourth phase or signal occurs, the card reader is indexed and the entire cycle of frame functions can begin anew, based on whatever control functions might be desired. It will be seen in FIGURE 9C that the card index motor 138 is coupled to the switch 140, which closes to send a positive pulse (FIGURE 13F) through the conductor 141 to the multivibrator 131–1, which is conditioned for firing. There occurs, therefore, a feedback signal to the frame index point in the multivibrator 133–1 which corresponds to frame X1. It will be understood, therefore, that the multivibrator 133–1 is tripped with each read out signal and the multivibrator 133–2 is tripped by each card index signal. In the voltage profiles of FIGURES 13A–13I, it will be seen that the signals X1, X2 and X3 occur in rapid sequence one after the other, after which a card index signal comes up. This represents an electronic scanning or switching cycle in which each of the three X functions is examined. This occurs whether or not there happens to be any machine tool function assigned thereto. When this occurs, the duration of the frame function signal will be automatically extended for whatever time it takes the machine to perform that function. When that function is completed, the read out signal will cause the system to switch electronically to the next frame function, or, if all the functions, three in the illustrated case, have been swept, the card or key index signal will come up automatically. In this fashion, it is possible to impart versatility in terms of machine tool functions to a data recording and logic system in which a minimum of encoded perforations, in this case 0–7, are carried by each key.

Referring next to FIGURE 12, there is illustrated one of the three hydraulic systems which respond to the coarse and fine control signals to drive the slides of the machine tool to precise positions. It will be understood that, like the channel control system of FIGURES 6A . . . 6G, one complete hydraulic system is provided for each movable part or slide.

The actuator 29 (FIGURE 1) is a hydraulic jack which is coupled, in this case, to the turret slide of the machine tool. The jack includes a cylinder 150 in which is mounted a piston 151. The piston 151 is driven in its cylinder by means of hydraulic pressure applied selectively to the ends of the cylinder by conduits 152 and 153 connected to a reversing and shut off valve 154 actuated by the solenoids 94–1 and 94–2 (FIGURE 6G). One output of the reversing valve is connected to a sump or reservoir 155 associated with the pressure source or pump 156. The other connection to the valve 154 is a pressure conduit 157.

The pressure conduit 157 is divided into two parallel sections 158 and 159, both of which connect to a common pressure conduit 160, which includes a pressure relief valve 161 and a filter 162 and which connects to the pressure source or pump 156. Branching off the pressure conduit 160 is a pressure conduit 163 for other channels and including an accumulator 164 and a check valve 165. The conduit 163 feeds a hydraulic line 166, which supplies pressure to such auxiliary components as a saddle clamp 167 energized through a conduit 167–1, which includes a control valve 167–2 actuated by the solenoid 108–4 (FIGURE 6D). The pump 156 also includes a back pressure control circuit 168 including a solenoid operated control valve 168–1.

The conduit section 158 includes a shut off valve 158–1 operated by the solenoid 108–5, a check valve 158–2 and a flow regulating valve 158–3 controlled by a feed rate servo 158–4 driven from the potentiometer 114 in the feed rate controller of the selected control dial from among 36–1 . . . 36–16. The flow regulating valve 158–3 includes a spring loaded relief circuit 158–5. The conduit 159, in parallel with the conduit 158, includes a quick shut off valve 159–1 operated by a control valve 159–2 actuated by the traverse solenoid 107–1. Also included in the conduit 159 is a pressure relief circuit and flow regulating valve 159–3. Normally, the conduit 159 will accommodate considerably less flow than the conduit 158, or, in the illustrated system, about one-sixth the flow.

In operation, assuming the coarse and fine dial command transducers call for a position of the slide which differs widely from that indicated by the position transducer 32, the slide will be driven at its fastest rate, i.e., the traverse rate, due to the fact that the valve 159–1 in the conduit 159 and the valve 158–1 in the conduit 158 will be opened. As the slide approaches its desired end position and the signal from the transfer gate circuit switches from the coarse or digital signal to its fine or analogue signal, the traverse valve 159–1 will be energized from the traverse control circuit 107 (FIGURE 6F) and will close. Immediately, the rate of movement of the slide is reduced by a substantial factor, due to the reduced flow path through the conduit 158. As the bridge circuit reaches its false null (FIGURE 8G), which is slightly in advance of the actual null, the rapid action valve 158–1 will be closed by the cut-off control circuit 108–3 (FIGURE 6G) to terminate the hydraulic flow to the cylinder. In this fashion, precise positioning of the slide is obtained, with the combination of coarse and fine signals from the transducers being matched by correspondingly arranged full and partial flow hydraulic circuit.

The shut off valves, it will be observed, are disposed between the spring loaded pressure relief and flow regulating valve. The system is thus protected against oscillations and resonances which might occur were the hydraulic flow to be abruptly terminated with the spring elements in the system.

It will be seen, therefore, that a highly versatile control system is provided in accordance with the present invention. The invention having been illustrated as applied to a machine tool controller for a turret lathe, there are included circuits and functions which are uniquely applicable to such a tool. More simplified machine tools, such as drills, grinders, and the like, which require relatively few end points in any given operation and in which there is a selection of as few as one tool would require a more simplified control system, particularly with respect to logic functions. It will also be understood that the invention can take various other forms and arrangements. For example, the digital analogue function of the position controlling channels can be based on a transducer having two rather than four windings. In such a case, as is shown in FIGURES 6D, and 11, the two coils, appropriately spaced, would yield successive signals although alternately a phase reversal would occur. The phase reversed signal can, of course, be utilized, through conventional circuitry, in the same manner as the signals of the system of the invention in the form illustrated in the drawings. Whereas in the illustrated arrangement (FIGURE 5) two of the counters 75 and 76 are used to control the transducer selector circuit 70, only one would be required to control a two coil system. In this connection, it should be understood that the function of controlling the transducer selection is a dual function of the counters which could, if desired, be performed by other circuitry. Basically, the counters are arranged to count one-half inch increments of travel of the movable part.

The invention should not, therefore, be regarded as limited except as defined by the following claims.

I claim:

1. In apparatus for controlling a machine tool having fixed and movable portions, transducer means having relatively movable parts connected respectively to fixed and movable portions of the machine tool, said transducer means including a series of repeating sections in at least one of its relatively movable parts, control means to store values representative of desired positions of movable portions of the machine tool, means connecting the transducer means to afford a series of nulls as the machine tool is operated to actuate the transducer means sequentially through its series of repeating sections, means to count and store indications of nulls to indicate digitally the position of a movable portion of the machine tool, means to compare values indicative of desired and actual positions of the movable portion, means including selector switch means response to a predetermined error signal less than unity in the digital count to connect the transducer means and the control means in a bridge circuit as an analogue comparator of desired and actual position signals, and means responsive to null readings of the analogue comparator to indicate the positioning of the movable machine tool portion at its desired position.

2. Apparatus as set forth in claim 1, said transducer means comprising a housing containing at least two identical inductance units spaced apart in the direction of transducer movement, and a core movable relatively to the housing and containing alternate magnetic and non-magnetic portions along its length, said core portions and inductance units being arranged spatially to afford substantially linear outputs from at least one of the inductance units at all positions, one unit affording an output for one increment of travel and another unit the output for the next increment of travel.

3. Apparatus as set forth in claim 1, including means associated with said control means to adjustably vary the rates of motion of the movable portions toward the respective desired positions thereof.

4. Apparatus as set forth in claim 1, including recorded program means to initiate successive functions of the machine tool, said control means for storing values representative of desired position of movable portions of the machine tool including a plurality of storage units associated respectively with a plurality of termination points for movable portions of the machine tool pursuant to work cutting operations, and means responsive to recorded program means to select a particular storage means for each of the respective functions in the cycle of operation of the machine tool to connect the storage means in said bridge circuit.

5. Apparatus as set forth in claim 4, each of said storage means including coarse transducer means to afford digital comparison data and fine transducer means to afford analogue data for use in said bridge circuit.

6. Apparatus as set forth in claim 5, said fine and coarse transducer means including a common control member.

7. Apparatus as set forth in claim 6 including comparator means to compare coarse transducer output with the output of said transducer means movable with the movable portions of the machine tool.

8. Apparatus as set forth in claim 7, said comparator including circuit means to yield a positive limited output voltage when the transducer means output exceeds that afforded by the setting of the coarse transducer means, zero output when the outputs are equal and a negative limited voltage when the coarse transducer means output exceeds that of the transducer means.

References Cited

UNITED STATES PATENTS

| | | | |
|---|---|---|---|
| 2,149,336 | 3/1939 | Darnell | 336—136 |
| 2,475,245 | 7/1949 | Leaver et al. | 318—162 |
| 2,537,770 | 1/1951 | Livingston et al. | 318—162 |
| 2,710,934 | 6/1955 | Senn | 90—13.99 X |
| 2,854,114 | 9/1958 | Hillyer et al. | 192—143 |
| 2,860,751 | 11/1958 | Seigle | 192—143 |
| 2,866,506 | 12/1958 | Hierath et al. | |
| 2,916,342 | 12/1959 | Neergaard. | |
| 2,943,251 | 6/1960 | Hull | 90—13.99 X |
| 2,947,929 | 8/1960 | Bower | 318—28 |
| 2,969,490 | 1/1961 | Anderson | 90—13.99 X |
| 3,002,404 | 10/1961 | Estabrook | 90—13.99 X |
| 3,063,311 | 11/1962 | Beckwith et al. | |
| 3,068,386 | 12/1962 | Jaeger et al. | 318—28 |
| 3,218,591 | 11/1965 | Caruthers | 336—131 |

FOREIGN PATENTS

| | | |
|---|---|---|
| 1,114,501 | 12/1955 | France. |
| 480,755 | 2/1938 | Great Britain. |

BENJAMIN DOBECK, *Primary Examiner.*

WILLIAM W. DYER, JR., NEIL C. REED, LEON PEAR, *Examiners.*